(12) United States Patent
Sato et al.

(10) Patent No.: US 6,897,768 B2
(45) Date of Patent: May 24, 2005

(54) OBSTACLE DETECTING APPARATUS AND RELATED COMMUNICATION APPARATUS

(75) Inventors: Yoshihisa Sato, Nagoya (JP); Masakazu Takeichi, Okazaki (JP); Hiroshi Ogura, Okazaki (JP)

(73) Assignee: Denso Corporation, Kariya (JP)

(*) Notice: Subject to any disclaimer, the term of this patent is extended or adjusted under 35 U.S.C. 154(b) by 228 days.

(21) Appl. No.: 10/216,832

(22) Filed: Aug. 13, 2002

(65) Prior Publication Data
US 2003/0034883 A1 Feb. 20, 2003

(30) Foreign Application Priority Data

Aug. 14, 2001 (JP) ........................... 2001-245858
Nov. 8, 2001 (JP) ........................... 2001-343518

(51) Int. Cl.[7] .............................. B60Q 1/00; B62D 1/24
(52) U.S. Cl. ................... 340/435; 340/505; 340/903; 180/167; 180/169; 367/909; 342/118
(58) Field of Search ................... 340/435, 436, 340/903, 505, 10.1, 425.5; 180/167, 169; 367/91, 93, 909; 307/9.1, 10.1; 342/118, 458

(56) References Cited

U.S. PATENT DOCUMENTS

| | | | |
|---|---|---|---|
| 4,910,512 A | 3/1990 | Riedel | 340/943 |
| 5,229,975 A * | 7/1993 | Truesdell et al. | 367/107 |
| 5,265,832 A * | 11/1993 | Wesling et al. | 246/169 R |
| 5,751,211 A | 5/1998 | Shirai et al. | 340/435 |
| 6,232,910 B1 * | 5/2001 | Bell et al. | 342/70 |

FOREIGN PATENT DOCUMENTS

| | | |
|---|---|---|
| EP | 3806847 A1 | 3/1988 |
| EP | 43 38 743 A1 | 11/1993 |
| EP | 197 16 680 C1 | 4/1997 |
| EP | 3420 004 A1 | 5/2004 |
| JP | A-S61-60041 | 3/1986 |
| JP | A-S62-71344 | 4/1987 |
| JP | A-H01-185043 | 7/1989 |
| JP | A-H04-369796 | 12/1992 |
| JP | 05-28982 | 4/1993 |
| JP | A-H09-318739 | 12/1997 |
| JP | 10-112000 | 4/1998 |
| JP | A-H10-271138 | 10/1998 |
| JP | 11041260 | 2/1999 |
| JP | 11167698 | 6/1999 |
| JP | A-2001-24643 | 1/2001 |
| JP | 2001063500 | 3/2001 |
| JP | 2001-108739 | 4/2001 |

* cited by examiner

Primary Examiner—Donnie L. Crosland
(74) Attorney, Agent, or Firm—Posz Law Group, PLC

(57) ABSTRACT

A plurality of ultrasonic sensors are installed at predetermined positions of an automotive vehicle. Each sensor has the capability of performing calculation for measuring a distance between an obstacle and the automotive vehicle and transmitting distance information representing a measured distance of the obstacle. A control unit receives the distance information and generates an alarm signal based on the distance information.

15 Claims, 14 Drawing Sheets

FIG. 8A
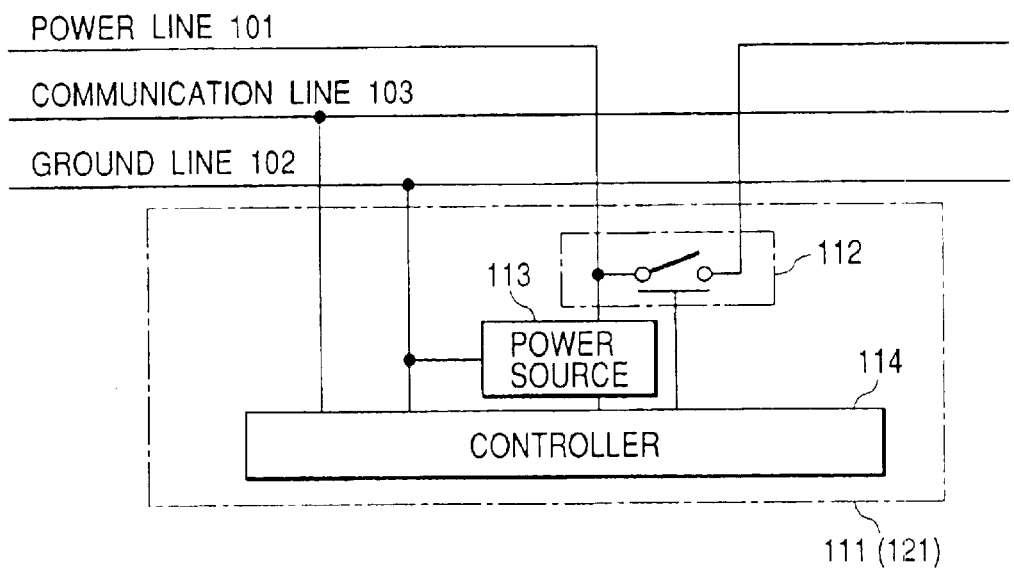
FIG. 8B
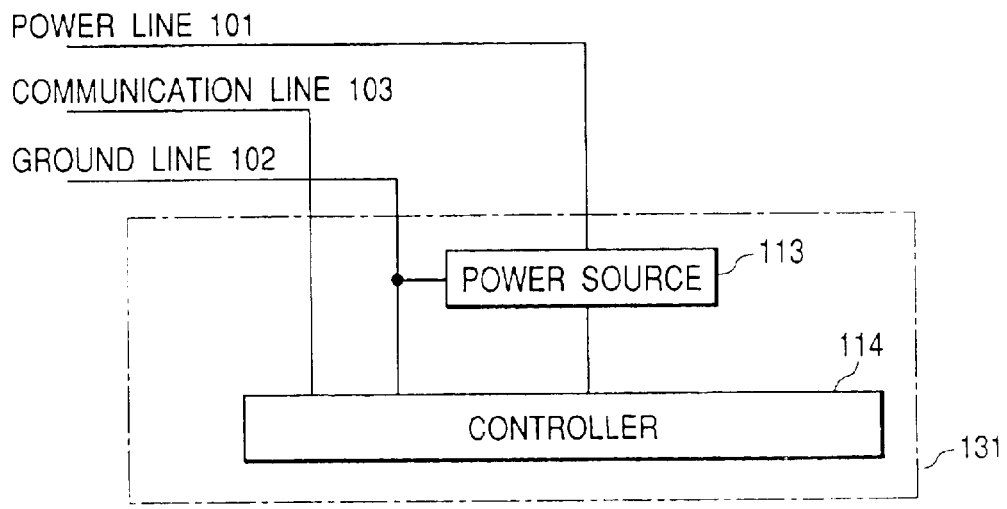
FIG. 9
| SOF | ADDRESS | MESSAGE CLASS | ID | FRAME LENGTH | ECC | EOF |

OBSTACLE DETECTING APPARATUS AND RELATED COMMUNICATION APPARATUS

BACKGROUND OF THE INVENTION

The present invention relates to an obstacle detecting apparatus equipped in an automotive vehicle to detect an obstacle and generate an alarm when the obstacle is within a warning distance.

FIG. 5 is a circuit block diagram showing a conventional obstacle detecting apparatus which comprises a plurality of ultrasonic sensors 11, 41, 51 and 61, each serving as obstacle detecting sensor, provided at predetermined positions (e.g., front and rear bumpers) of an automotive vehicle. An electronic control unit (hereinafter, abbreviated ECU) 1, acting as central control apparatus, is connected to the ultrasonic sensors 11, 41, 51 and 61 via lines 70, 80, 90 and 100, respectively, so as to form a star connection pattern.

The microcomputer 2, equipped in ECU 1, executes the obstacle detecting processing when the shift position 72 of an automatic transmission (not shown) of an automotive vehicle is in one of the shift positions of R(reverse), D(drive), 2(second) and L(low) and when the vehicle speed 73 is equal to or less than 10 km/h.

First, the microcomputer 2 sends a transmit SW signal to analog switch 4 and a receive SW signal to analog switch 7. In response to these signals, both the analog switch 4 and analog switch 7 establish the lines connecting microcomputer 2 to ultrasonic sensor 11.

Next, the microcomputer 2 controls transmission driver 3 to generate an ultrasonic wave pulse (e.g., 10 consecutive rectangular waves of 40 kHz). Furthermore, the microcomputer 2 produces a threshold (voltage) 8 which is applied to one terminal of comparator 6. The threshold 8 determines a level for judging an obstacle. The comparator 6 has another terminal for receiving a sensor signal obtained from ultrasonic sensor 11. The comparator 6 compares the entered sensor signal with the given threshold.

The ultrasonic wave pulse, generated by transmission driver 3, is sent to ultrasonic sensor 11 via analog switch 4 and line 70. The ultrasonic sensor 11 comprises transmitting circuit 12, receiving gain adjusting section 13, and amplifier 14. When the ultrasonic wave pulse is entered into ultrasonic sensor 11, the transmitting circuit 12 emits a ultrasonic wave via a microphone 15. When any obstacle is present in a predetermined sensing area of ultrasonic sensor 11, the microphone 15 receives a reflected ultrasonic wave returning from this obstacle. The reflected ultrasonic wave, received by microphone 15, is amplified by amplifier 14 and is then entered into receiving gain adjusting section 13 to adjust the gain of reflected ultrasonic wave. The sensor signal, i.e., the reflected ultrasonic wave signal thus adjusted, is then sent to ECU 1 via line 70.

In ECU 1, the received sensor signal is entered into comparator 6 via analog switch 7 and receiving gain adjusting section 5. The comparator 6 compares the entered sensor signal with the threshold 8 given from microcomputer 2. When the sensor signal is larger than the give threshold 8, the comparator 6 sends an obstacle detection signal to microcomputer 2. The microcomputer 2 performs measurement of time which starts upon transmission of the ultrasonic wave and is up at entry of the obstacle detection signal. The microcomputer 2 converts the measured time into a corresponding distance of an obstacle. When the distance of the obstacle is within a predetermined warning distance, the microcomputer 2 generates an alarm.

After finishing the processing in the ultrasonic sensor 11, similar processing is performed successively for each of other ultrasonic sensors 41, 51 and 61 although a predetermined dormant period is provided. This dormant period is equivalent to a time required for eliminating adverse influence of multipath reflection waves caused by the obstacle or other objects (e.g., roads etc.). Hereinafter, this dormant period is referred to as multipath duration.

Relying only one judgement is not preferable to eliminate any possible error detection. Thus, the alarm is generated only when the obstacle detection signal is repetitively entered. The position of the detected obstacle is indicated in relation to the ultrasonic sensor having detected this obstacle, for example, on an LCD display installed on a dashboard. When the detected distance of the obstacle is in the range from 20 cm to 50 cm, an alarm indicator flickers with intermittent sound. When the detected distance of the obstacle is shorter than 20 cm, the alarm indicator continuously turns with continuous sound.

However, according to the above-described prior art, only ECU 1 has calculating function and this will cause various problems. For example, the signals sent from respective ultrasonic sensors 11, 41, 51, and 61 to ECU 1 are weak analog signals of several mV which are poor in noise durability. When such weak analog signals are sent from respective sensors provided at the front and rear bumpers of the automotive vehicle to ECU 1 via the long signal transmission path of lines 70, 80, 90, and 100, various electromagnetic noises may be superposed during the propagation of the signals via the lines 70, 80, 90 and 100 and will be erroneously recognized as the obstacle detection signal.

Furthermore, the signals detected by respective ultrasonic sensors 11, 41, 51, and 61 are collected and calculated in ECU 1. This will increase the calculation or computation load of ECU 1.

Furthermore, the ultrasonic sensors 11, 41, 51, and 61 are activated one by one with sufficient time intervals so as to eliminate the influence of multipath reflection waves which are produced by obstacles and other objects (e.g., road). This will require a long time to detect the obstacle. Issuance of alarm will be delayed, correspondingly.

The microphones 15 of respective ultrasonic sensors 11, 41, 51, and 61 are usually mass produced with manufacturing differences or variability in the oscillation frequency as well as in the sound pressure level. Thus, there is the possibility that ECU 1 may not have functionally good correspondence with each of other mass-produced individual ultrasonic sensors. The installation position and angle of respective ultrasonic sensors 11, 41, 51, and 61 are different in each type of automotive vehicles. Accordingly, it is necessary to perform the adjustment of receiving gain for each of respective ultrasonic sensors 11, 41, 51, and 61. Furthermore, the microphone 15 will require severe spec. Furthermore, it is necessary to differentiate the threshold 8 for each of the respective ultrasonic sensors 11, 41, 51, and 61 or for each type of automotive vehicles.

SUMMARY OF THE INVENTION

In view of the above-described problems of the prior art, the present invention has an object to provide an obstacle detecting apparatus which is capable of improving the noise durability and also capable of reducing the load of ECU.

Another object of the present invention is to provide an obstacle detecting apparatus which is capable of improving the response in the detection of an obstacle.

Another object of the present invention is to provide an obstacle detecting apparatus which is capable of substantially eliminating the variability in performance of signal sources and differences in the installation position and angle of respective sensors.

To accomplish the above-described and other related objects, the present invention provides an obstacle detecting apparatus comprising at least one sensor installed at a predetermined position of an automotive vehicle, the sensor having the capability of performing calculation for measuring the distance between an obstacle and the automotive vehicle and transmitting distance information representing a measured distance of the obstacle, and a control unit for receiving the distance information and generating an alarm signal based on the distance information.

The obstacle detecting apparatus of this invention is characterized in that the sensor itself has the capability of performing calculation for measuring the distance between an obstacle and the automotive vehicle and transmitting the distance information to the control unit. Accordingly, it becomes possible to improve the durability against noises. Furthermore, it becomes possible to reduce the calculation or computation load of the control unit. Hence, it is not necessary to provide or add a special CPU for the obstacle detection. For example, it is possible to use the CPU already equipped in a meter of an instrument panel or the CPU of a navigation system. The required time for the obstacle detecting processing at the CPU side is relatively short. Accordingly, the CPU can perform the obstacle detecting processing during a vacant time or a dormant period of CPU.

According to the present invention, it is preferable that the control unit successively transmits polling signals for a plurality of sensors. The plurality of sensors simultaneously start measurement of the obstacle in response to a designated one of the polling signals. And, each of the plurality of sensors calculates the distance between the obstacle and the automotive vehicle and transmits the distance information to the control unit in synchronism with a polling signal corresponding to each of the plurality of sensors.

According to this arrangement, a plurality of sensors transmit the distance measuring signal simultaneously rather than transmitting it successively (i.e., one by one) in a time division manner. Thus, it becomes possible to improve the response required in the obstacle detecting operation.

Furthermore, according to the present invention, it is preferable that the sensor comprises a comparator for generating an obstacle detection signal when the signal level of a distance measuring signal reflected from the obstacle is higher than a predetermined threshold. A nonvolatile memory stores the threshold. The control unit transmits to the nonvolatile memory an initial value of the threshold which is adjusted beforehand so as to eliminate manufacturing differences or variability of individual sensors.

Furthermore, according to the present invention, it is preferable that the sensor comprises a nonvolatile memory for storing an oscillation frequency of a distance measuring signal transmitted to the obstacle. The nonvolatile memory receives from an external device the oscillation frequency which is adjusted beforehand so as to eliminate manufacturing differences or variability of individual sensors.

Furthermore, according to the present invention, it is preferable that the sensor comprises a nonvolatile memory for storing an amplifying gain of a distance measuring signal reflected from the obstacle. The nonvolatile memory receives from an external device the amplifying gain which is adjusted beforehand so as to eliminate manufacturing differences or variability of individual sensors.

Furthermore, another object of the present invention is to provide a communication apparatus capable of accurately setting ID for each sensor (i.e., slave) without forcing a worker during the installation work to carefully check the agreement between each sensor and a designated installation position.

To accomplish the above-described and other related objects, the present invention provides a first communication apparatus comprising a master apparatus, a plurality of slave apparatuses disposed at predetermined positions and connected via a bus to the master apparatus, and switches for successively and serially connecting the plurality of slave apparatuses via the bus. The master apparatus establishes a first bus route for connecting the master apparatus to a first slave apparatus which is closest to the master apparatus. The master apparatus assigns identification data to the first slave apparatus according to an installation position of the first slave apparatus via the first bus route. The first slave apparatus closes a switch to establish a second bus route for connecting the first slave apparatus to a second slave apparatus which is next closest to the master. And, the master apparatus assigns identification data to the second slave apparatus according to an installation position of the second slave apparatus via the first and second bus routes, thereby successively assigning individual identification data to respective slave apparatuses in order of closeness to the master.

According to the first communication apparatus, it is preferable that a power line extending from the master apparatus serially connects the plurality of slave apparatuses via the switches, and the first slave apparatus closes the switch to establish a power line for supplying electric power from the master apparatus to the second slave apparatus.

According to the first communication apparatus, it is preferable that a communication line extending from the master apparatus serially connects the plurality of slave apparatuses via the switches, and the first slave apparatus closes the switch to establish a communication line for transmitting a message from the master apparatus to the second slave apparatus.

According to the first communication apparatus, it is preferable that a ground line extending from the master apparatus serially connects the plurality of slave apparatuses via the switches, and the first slave apparatus closes the switch to establish a ground line for supplying electric power from the master apparatus to the second slave apparatus.

Furthermore, the present invention provides a second communication apparatus comprising a master apparatus, a plurality of slave apparatuses disposed at predetermined positions and connected via a bus to the master apparatus, and identification setting lines provided independent of the bus for successively and serially connecting the plurality of slave apparatuses. The master apparatus activates a first identification setting line connecting the master apparatus to a first slave apparatus which is closest to the master apparatus. The master apparatus assigns identification data to the first slave apparatus according to an installation position of the first slave apparatus via the bus in response to activation of the first identification setting line. The first slave apparatus activates a second identification setting line connecting the first slave apparatus to a second slave apparatus which is next closest to the master apparatus. And, the master apparatus assigns identification data to the second slave apparatus according to an installation position of the second slave apparatus via the bus in response to activation of the second identification setting line, thereby successively assigning individual identification data to respective slave apparatuses in order of closeness to the master apparatus.

According to the first or second communication apparatus, it is preferable that the plurality of slaves are obstacle detecting sensors installed at predetermined positions of an automotive vehicle, and the master apparatus is a control unit for assigning individual identification data to respective sensors according to the installation positions of respective sensors and for detecting the position of a detected obstacle with reference to identification data of the sensor.

BRIEF DESCRIPTION OF THE DRAWINGS

The above and other objects, features and advantages of the present invention will become more apparent from the following detailed description which is to be read in conjunction with the accompanying drawings, in which:

FIG. 8A is a circuit diagram showing the arrangement of first and second slaves shown in FIG. 6 in accordance with the third embodiment of the present invention;

FIG. 8B is a circuit diagram showing the arrangement of a third slave shown in FIG. 6 in accordance with the third embodiment of the present invention;

FIG. 9 is a drawing explaining the format of a communication frame used between the master and slaves in accordance with the third embodiment of the present invention;

DESCRIPTION OF THE PREFERRED EMBODIMENTS

Figure 1:
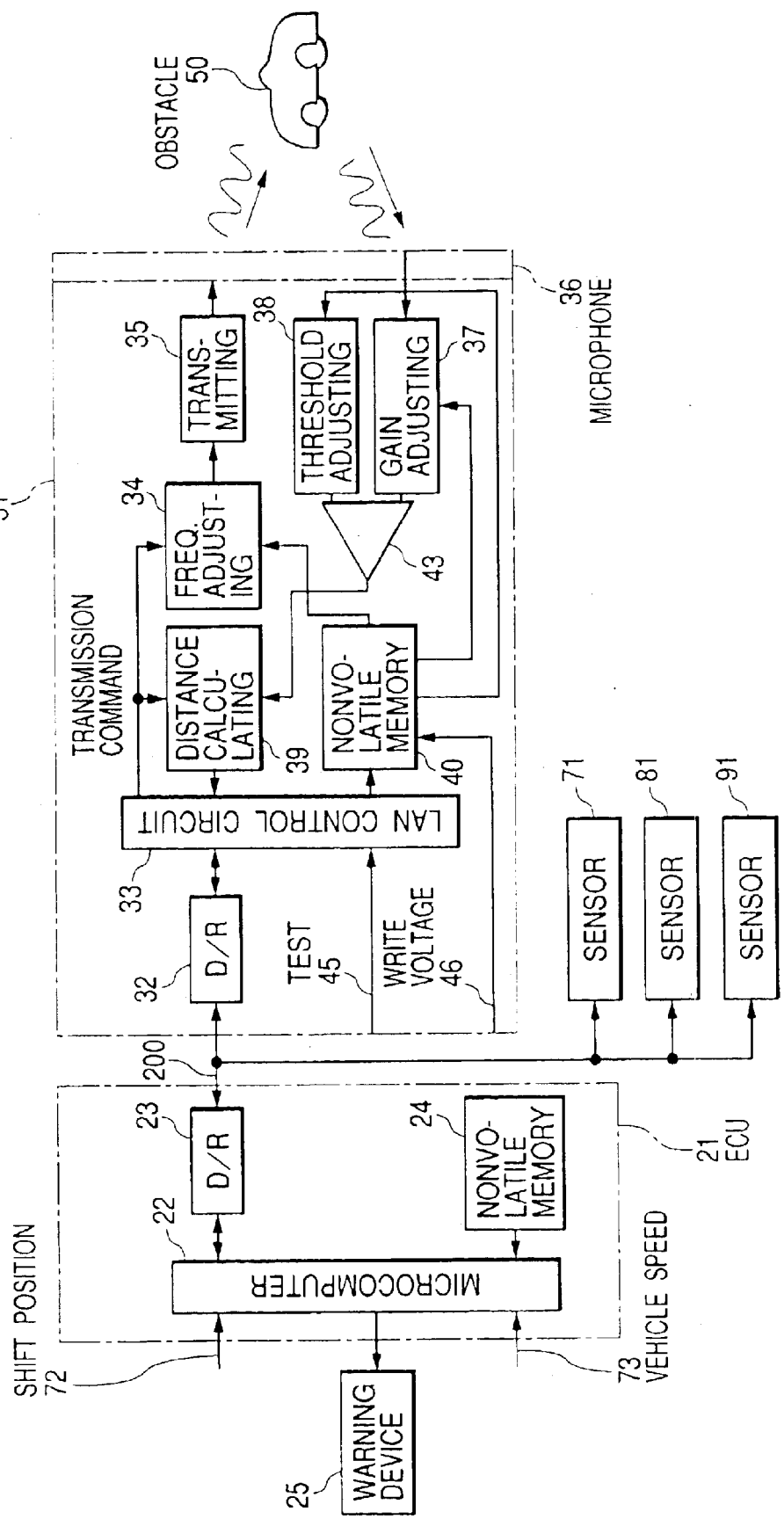
FIG. 1 is a circuit block diagram showing an obstacle detecting apparatus in accordance with the present invention.

Preferred embodiments of the present invention will be explained hereinafter with reference to attached drawings. Identical parts are denoted by the same reference numerals throughout the drawings.

First Embodiment

Figure 2:
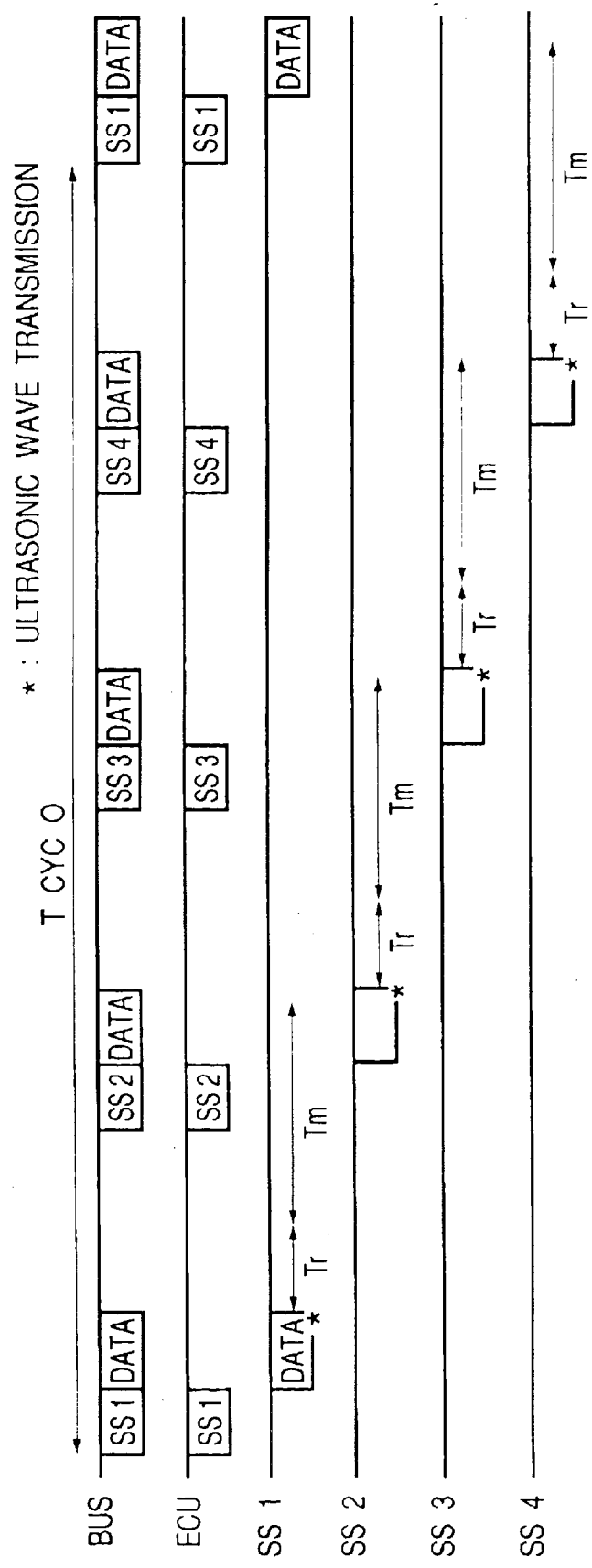
FIG. 2 is a timing chart showing communication sequence of the obstacle detecting apparatus in accordance with a first embodiment of the present invention.

Hereinafter, a first embodiment of the present invention will be explained with reference to the attached drawings. FIG. 1 is a circuit block diagram showing an obstacle detecting apparatus in accordance with the first embodiment of the present invention. FIG. 2 is a timing chart showing the communication sequence of the obstacle detecting apparatus.

In FIG. 1, ultrasonic sensors 31, 71, 81, and 91 each having calculation and other various functions are installed at appropriate obstacle detecting positions (e.g., front and rear bumpers) of an automotive vehicle. ECU 21 is connected to each of ultrasonic sensors 31, 71, 81, and 91 via bus 200. Microcomputer 22, accommodated in ECU 21, performs the following obstacle detecting processing when the shift position 72 of an automatic transmission (not shown) of the automotive vehicle is in one of R(reverse), D(drive), 2(second), and L(low) and when the vehicle speed 73 is equal to or less than 10 km/h.

First, as shown in FIG. 2, the microcomputer 22 of ECU 21 transmits via communication driver/receiver (D/R) 23 to bus 200 a first polling frame including identification information (ID=SS1) of the ultrasonic sensor 31. FIG. 2 shows communication sequence of four sensors (ID=SS1, SS2, SS3, and SS4). In this embodiment, the ultrasonic sensors 31, 71, 81, and 91 are given or assigned the identification data ID=SS1, SS2, SS3, and SS4, respectively.

Each of the functional ultrasonic sensors 31, 71, 81, and 91 has communication driver/receiver (D/R) 32 and LAN control circuit 33 which cooperatively receive and decode the polling frame sent from ECU 21. Upon recognizing the identification data ID=SS1, the LAN control circuit 33 of ultrasonic sensor 31 outputs a transmission command to frequency adjusting circuit 34 and to distance calculating circuit 39. The frequency adjusting circuit 34 generates oscillating ultrasonic burst wave having a resonance frequency memorized beforehand in nonvolatile memory 40. The ultrasonic burst wave is transmitted into the air (i.e., toward an obstacle 50) via transmitting circuit 35 and microphone 36 after the data field of the first polling frame (ID=SS1) has passed. In FIG. 2, star mark (★) indicates the timing of transmitting the ultrasonic burst wave.

If the ultrasonic wave thus transmitted from the sensor 31 is reflected by the obstacle 50 residing in a detecting area of this sensor, the reflected wave is received by microphone 36. The received signal is entered into gain adjusting circuit 37 to adjust the gain of this signal. Then, the received signal is sent to one terminal of comparator 43 to compare the received signal level with a given threshold. The threshold adjusting circuit 38 generates the threshold which is applied to the other terminal of comparator 43. The nonvolatile memory 40 memorizes gain values for the gain adjusting circuit 37 and threshold values for threshold adjusting circuit 38. The nonvolatile memory 40 supplies a predetermined gain to the gain adjusting circuit 37, and also supplies a predetermined threshold to threshold adjusting circuit 38. When the received signal level is larger than the given threshold, the comparator 43 generates an obstacle detecting signal. The obstacle detecting signal is sent from comparator 43 to distance calculating circuit 39. The distance calculating circuit 39 converts time data into distance data. More specifically, the distance calculating circuit 39 starts measurement of time upon receiving the transmission command generated from LAN control circuit 33 and stops the measurement of time upon receiving the obstacle detecting signal generated from comparator 43. The measured time is then converted into distance data with reference to the propagation speed of ultrasonic wave. The distance calculating circuit 39 temporarily stores the thus converted distance data until the first polling frame (ID=SS1) for the sensor 31 is generated in the next cycle Tcyco. In FIG. 2, Tr represents the measured time between transmission of ultrasonic wave and receiving of the returning ultrasonic wave.

Next, as shown in FIG. 2, when a predetermined time has passed after transmitting the first polling frame (ID=SS1), the microcomputer 22 of ECU 21 transmits via D/R 23 to bus 200 a second polling frame including identification information (ID=SS2) of the ultrasonic sensor 71. The time interval between transmission of first polling frame (ID=SS1) and second polling frame (ID=SS2) should be determined considering the influence of multipath reflection waves. In FIG. 2, Tm represents a multipath duration in which the sensor may be adversely influenced by the multipath reflection waves. According to the communication sequence of this embodiment, transmission of the second pooling frame (ID=SS2) just starts after termination of the multipath duration Tm.

Like the above-described ultrasonic sensor 31, the ultrasonic sensor 71 is a functional sensor capable of performing the ultrasonic wave transmitting and receiving operation for detecting the obstacle 50, comparing the received signal with a given threshold to eliminate noises, and calculating the distance of the detected obstacle 50.

In the same manner, when a predetermined time reflecting the multipath duration of sensor 71 (ID=SS2) has passed, the microcomputer 22 of ECU 21 transmits via D/R 23 to bus 200 a third polling frame including identification information (ID=SS3) of the ultrasonic sensor 81. Like the above-described ultrasonic sensors 31 and 71, the ultrasonic sensor 81 is a functional sensor capable of performing the ultrasonic wave transmitting and receiving operation for detecting the obstacle 50, comparing the received signal with a given threshold to eliminate noises, and calculating the distance of detected obstacle 50.

When a predetermined time reflecting the multipath duration of sensor 81 (ID=SS3) has passed, the microcomputer 22 of ECU 21 transmits via D/R 23 to bus 200 a fourth polling frame including identification information (ID=SS4) of the ultrasonic sensor 91. Like the above-described ultrasonic sensors 31, 71, and 81, the ultrasonic sensor 91 is a functional sensor capable of performing the ultrasonic wave transmitting and receiving operation for detecting the obstacle 50, comparing the received signal with a given threshold to eliminate noises, and calculating the distance of detected obstacle 50.

Then, when a predetermined time reflecting the multipath duration of sensor 81 (ID=SS3) has passed, the microcomputer 22 of ECU 21 transmits via D/R 23 to bus 200 the first polling frame of the next cycle Tcyco.

Then, in the next cycle Tcyco, each of the ultrasonic sensors 31, 71, 81, and 91 executes the ultrasonic wave transmitting and receiving operation for detecting the obstacle 50, compares the received signal with a given threshold to eliminate noises, and calculates the distance of detected obstacle 50 in response to a corresponding polling frame. At the same time, the distance calculating circuit 39 in each sensor transmits via LAN control circuit 33 and communication D/R 32 to bus 200 the distance data detected in response to the previous corresponding polling signal. The distance data is carried on a data field succeeding individual ID. In this case, it is possible to transmit the individual ID together with the distance data. ECU 21 generates an alarm signal to a warning device 25 when the distance data in the received frame is within a predetermined warning distance.

Relying only one judgement is not preferable to eliminate any possible error detection. Thus, the warning device 25 generates an alarm only when entry of the obstacle detection signal is repetitive for a predetermined time or is counted up to a predetermined number. The position of the detected obstacle 50 is indicated in relation to the ultrasonic sensor having detected the obstacle 50, for example, on an LCD display installed on a dashboard. When the detected distance of obstacle 50 is in the range from 20 cm to 50 cm, an alarm indicator (which is installed on an instrument panel) flickers with intermittent sound. When the detected distance of obstacle 50 is within 20 cm, the alarm indicator turns continuously with continuous sound.

As explained above, the first embodiment of the present invention provides an obstacle detecting apparatus which is equipped with functional ultrasonic sensors 31, 71, 81, and 91 which are capable of performing various operations not realized by the conventional sensors. Thus, it becomes possible to reduce the calculation or computation load of ECU. The signals sent out to bus 200 from the ultrasonic sensors 31, 71, 81, and 91 are digital signals which are robust against noises. Thus, the first embodiment of the present invention can improve the durability of the obstacle detecting apparatus against noises.

Second Embodiment

According to the above-described first embodiment, it is necessary to provide the measured time Tr and the multipath duration Tm for each of the functional ultrasonic sensors 31, 71, 81, and 91. Completing one cycle Tcyco of the communication sequence shown in FIG. 2 requires a relatively long time. This is disadvantageous in that generation of alarm is delayed even if the sensor can detect the obstacle 50 at an earlier timing.

The second embodiment is superior to the first embodiment in that the overall length of one complete cycle can be shortened.

Figure 3:
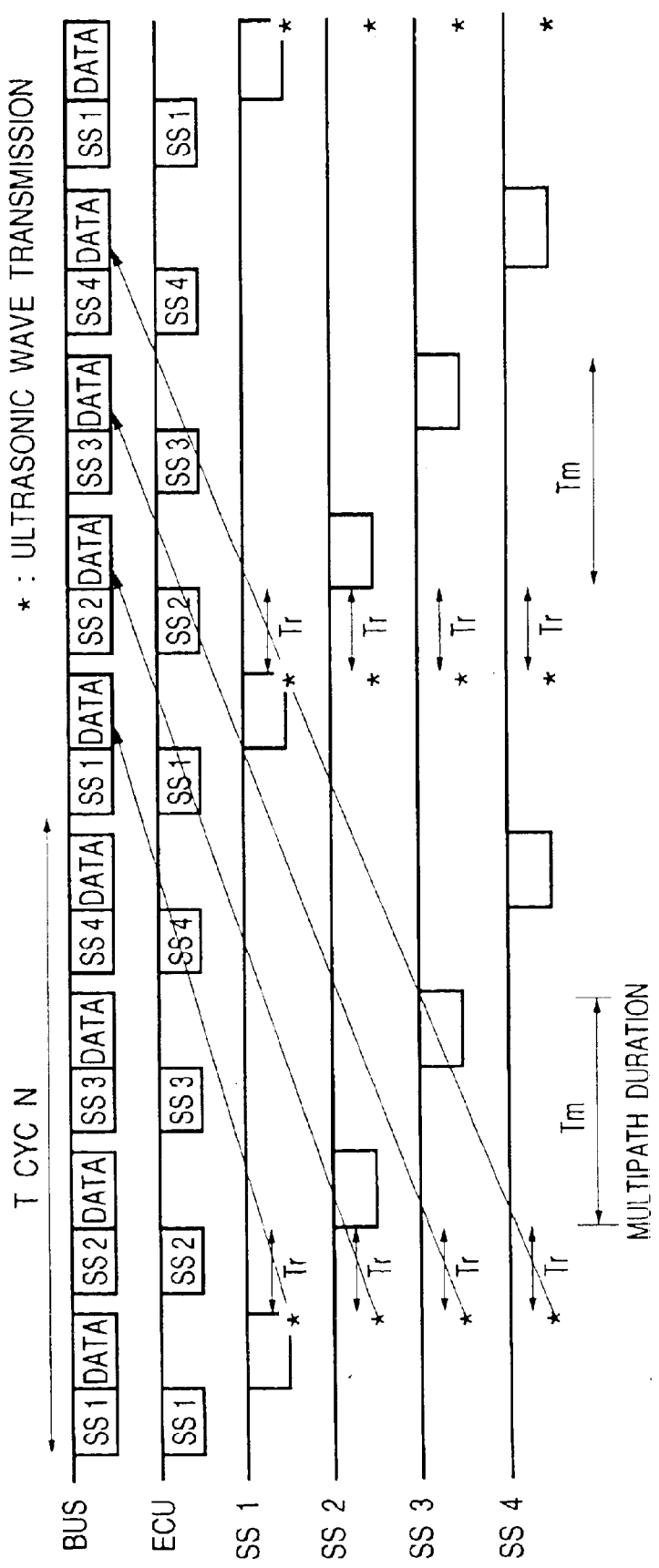
FIG. 3 is a timing chart showing another communication sequence of the obstacle detecting apparatus in accordance with a second embodiment of the present invention.

More specifically, as shown in FIG. 3, the microcomputer 22 of ECU 21 transmits via D/R 23 to bus 200 a first polling frame including the identification information (ID=SS1). In this case, ID=SS1 is defined as a trigger for generating ultrasonic wave transmission commands for all of the ultrasonic sensors 31, 71, 81, and 91. Next, after the data field of the first polling frame (ID=SS1) has passed, the microcomputer 22 successively transmits at predetermined intervals via D/R 23 to bus 200 a second polling frame including identification information (ID=SS2) for the ultrasonic sensor 71, a third polling frame including identification information (ID=SS3) for the ultrasonic sensor 81, and a fourth polling frame including identification information (ID=SS4) for the ultrasonic sensor 91.

As shown in FIG. 1, each of the ultrasonic sensors 31, 71, 81, and 91 is a functional sensor which is equipped with communication driver/receiver (D/R) 32 and LAN control circuit 33 which cooperatively receive and decode the polling frame sent from ECU 21. Upon receiving the first polling frame (ID=SS1), each of the ultrasonic sensors 31, 71, 81, and 91 decodes the ultrasonic wave transmission command contained in this polling frame (ID=SS1) and performs the ultrasonic wave transmitting and receiving operation for detecting the obstacle 50, compares the received signal with a given threshold to eliminate noises, calculates the distance of detected obstacle 50, and temporarily memorizes the distance data.

In other words, after the data field of the first polling frame (ID=SS1) has passed, all of the ultrasonic sensors 31, 71, 81, and 91 simultaneously start measurement of the obstacle distance by simultaneously transmitting ultrasonic wave as indicated by star mark (★) in FIG. 3.

In the next cycle Tcycn, the distance calculating circuit 39 in each sensor transmits via LAN control circuit 33 and communication D/R 32 to bus 200 the distance data detected in response to the first polling signal in the previous cycle. The distance data is carried on a data field succeeding individual ID.

Like the previous cycle, upon receiving the first polling frame (ID=SS1), each of the functional ultrasonic sensors 31, 71, 81, and 91 decodes the ultrasonic wave transmission command contained in this polling frame (ID=SS1) and performs the ultrasonic wave transmitting and receiving operation for detecting the obstacle 50, then compares the received signal with a given threshold to eliminate noises, calculates the distance of detected obstacle 50, and temporarily memorizes the distance data.

In this manner, according to the second embodiment, all of the ultrasonic sensors 31, 71, 81, and 91 simultaneously start measurement of the obstacle distance by simultaneously transmitting ultrasonic wave immediately after passage of the data field of the first polling frame (ID=SS1).

It is now assumed that the number of frames (i.e., total number of sensors) is 4, one frame length is 5 ms, and the multipath duration Tm is 15 ms. According to the above-described first embodiment, the overall length of one complete cycle (=Tcyco) becomes 100 ms. On the other hand, the second embodiment can shorten the overall length of one complete cycle (=Tcycn) to the level of 20 ms.

As described above, the second embodiment can improve the response required in the obstacle detecting operation.

<Adjustment and Initial Settings>

As described above, the microphones 36 equipped in respective functional ultrasonic sensors 31, 71, 81, and 91 are usually mass produced with manufacturing differences or variability in the oscillation frequency as well as in the sound pressure level. The installation position and angle of respective ultrasonic sensors 31, 71, 81, and 91 are different in each type of automotive vehicles. Accordingly, the oscillation frequency, the receiving gain, and the threshold of respective functional ultrasonic sensors 31, 71, 81, and 91 are different from each other. In other words, it is necessary to optimize the oscillation frequency, the receiving gain, and the threshold of respective functional ultrasonic sensors 31, 71, 81, and 91. To this end, the nonvolatile memory 40 stores the optimized adjustment and initial setting data for each of respective functional ultrasonic sensors 31, 71, 81, and 91.

<Adjustment of Receiving Gain>

After accomplishing the installation of microphone 36 on a sensor circuit substrate, a test obstacle having a specified configuration is placed at a predetermined distance from the microphone 36. A writing apparatus (not shown) generates a H-level signal which enters as a test signal into test terminal 45 provided on the sensor circuit substrate as shown in FIG. 1. In response to this test signal, the LAN control circuit 33 in each of the functional ultrasonic sensors 31, 71, 81, and 91 turns into a test mode. ECU 21 transmits a transmission command onto bus 200. The voltage level of a reflected wave is monitored based on the output level of gain adjusting circuit 37.

When the voltage level of the reflected wave is lower (or higher) than a predetermined level, ECU 21 slightly increases (or decrease) the gain of adjusting circuit 37 via bus 200. This adjustment is continuously repeated until the voltage level of the reflected wave is equalized with the predetermined level. When the voltage level of the reflected wave is equalized with the predetermined level, a write voltage is applied to a write voltage terminal 46 of the sensor circuit substrate. An external writing apparatus (not shown) writes into the nonvolatile memory 40 via test terminal 45 the optimum receiving gain thus adjusted. Through this adjustment, it becomes possible to absorb the manufacturing differences or variability in the gain of microphones 36 of respective ultrasonic sensors 31, 71, 81, and 91.

<Adjustment of Oscillation Frequency>

After accomplishing the installation of microphone 36 on a sensor circuit substrate, a test obstacle having a specified configuration is placed at a predetermined distance from the microphone 36. A writing apparatus (not shown) generates a H-level signal which enters as a test signal into test terminal 45 provided on the sensor circuit substrate as shown in FIG. 1. In response to this test signal, the LAN control circuit 33 in each of the functional ultrasonic sensors 31, 71, 81, and 91 turns into a test mode. ECU 21 transmits a transmission command onto bus 200. The peak voltage level of a reflected wave is monitored based on the output level of gain adjusting circuit 37.

Thereafter, ECU 21 transmits onto bus 200 a transmission command including, for example, a command for slightly increasing the frequency. Then, the peak voltage level of a reflected wave is again monitored based the output level of gain adjusting circuit 37.

When the presently monitored peak voltage level is lower than the previously monitored peak voltage level, ECU 21 transmits a transmission command including a command slightly increasing the frequency. Then, the peak voltage level of a reflected wave is again monitored based the output level of gain adjusting circuit 37. Continuously repeating this procedure finally identifies the optimum frequency for maximizing the monitored peak voltage. When the peak voltage is maximized, a write voltage is applied to the write voltage terminal 46 of the sensor circuit substrate. The external writing apparatus (not shown) writes into the nonvolatile memory 40 via test terminal 45 the oscillation frequency thus identified. Through this adjustment, it becomes possible to absorb the manufacturing differences or variability in the oscillation frequency of the gain of microphones 36 of respective ultrasonic sensors 31, 71, 81, and 91.

<Initialization of Threshold>

Figure 4:
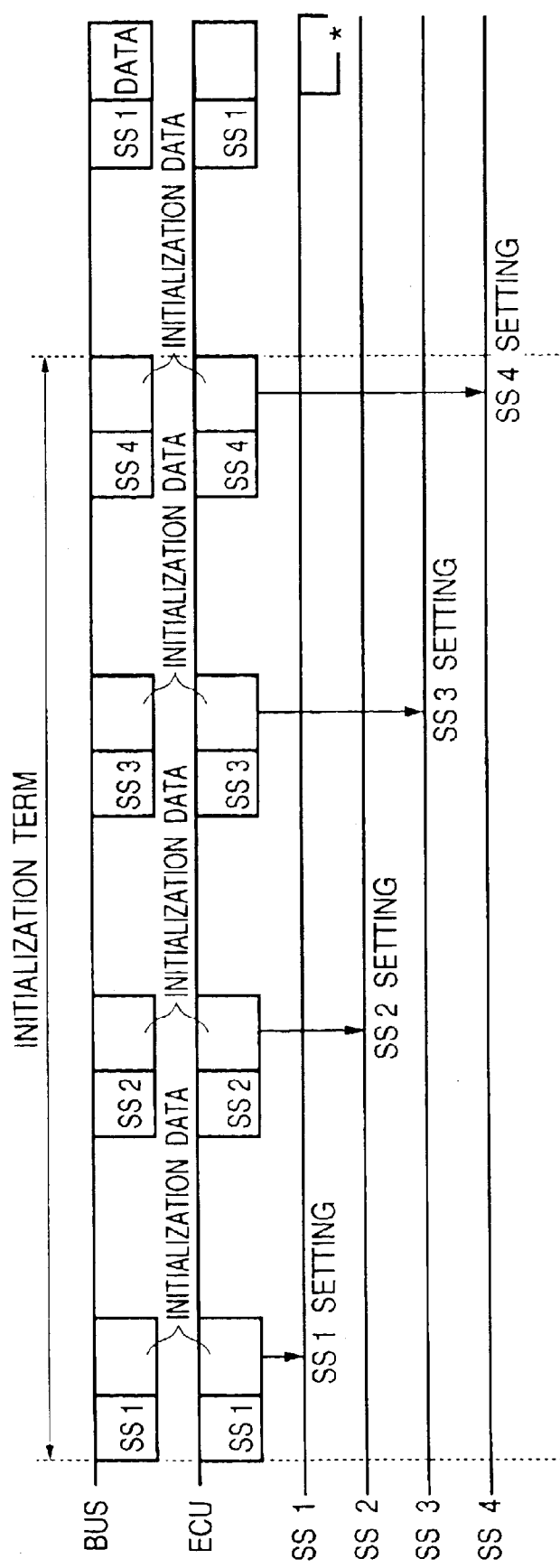
FIG. 4 is a timing chart showing initialization sequence for a threshold in accordance with the present invention.
Figure 5:
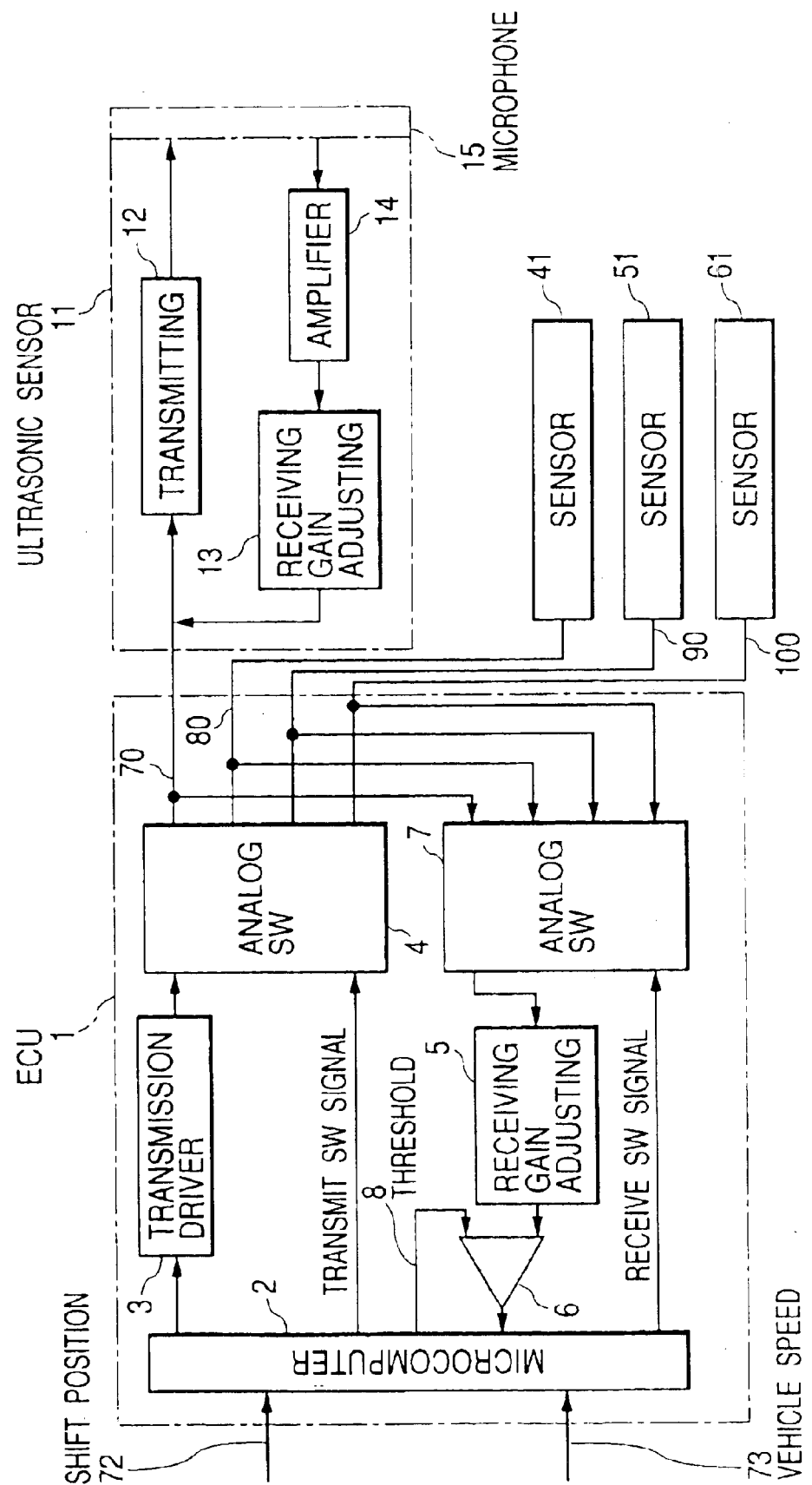
FIG. 5 is a circuit block diagram showing a conventional obstacle detecting apparatus.

After installing respective functional ultrasonic sensors 31, 71, 81, and 91 to predesignated positions of the vehicle at predesignated angles according to a corresponding type the vehicle, a test obstacle having a specified configuration is placed at a predetermined distance from the microphone 36. A writing apparatus (not shown) generates a H-level signal which enters as a test signal into test terminal 45 provided on the sensor circuit substrate as shown in FIG. 1. In response to this test signal, the LAN control circuit 33 in each of the functional ultrasonic sensors 31, 71, 81, and 91 turns into a test mode. ECU 21 transmits a transmission command onto bus 200 and causes each of the ultrasonic sensors 31, 71,81, and 91 to perform the ultrasonic wave transmitting and receiving operation for detecting the obstacle 50 and calculate the distance of detected obstacle 50. Each of the ultrasonic sensors 31, 71, 81, and 91 transmits the measured distance data to ECU 21. ECU 21 has nonvolatile memory 24 storing the threshold values corresponding to the measured distance data beforehand. The threshold values thus being set in ECU 21 are successively written into the nonvolatile memory 40 of respective functional ultrasonic sensors 31, 71, 81, and 91 in synchronism with the frame sent out onto bus 200 as shown in the timing chart of FIG. 4.

As explained above, the present invention makes it possible to improve the durability against noises and reduce the load of ECU. Furthermore, the present invention makes it possible to improve the response required in the obstacle detecting operation. Moreover, the present invention makes it possible to absorb the manufacturing differences or variability in the characteristics of the signal source for detecting the obstacle, or differences in the installation position and angle according to the type of vehicle.

Third Embodiment

The third embodiment relates to a communication apparatus including a plurality of slave apparatuses connected via a bus to a master apparatus, and more particularly to a communication apparatus preferably applicable to an obstacle detecting apparatus equipped in an automotive vehicle.

Figure 18:
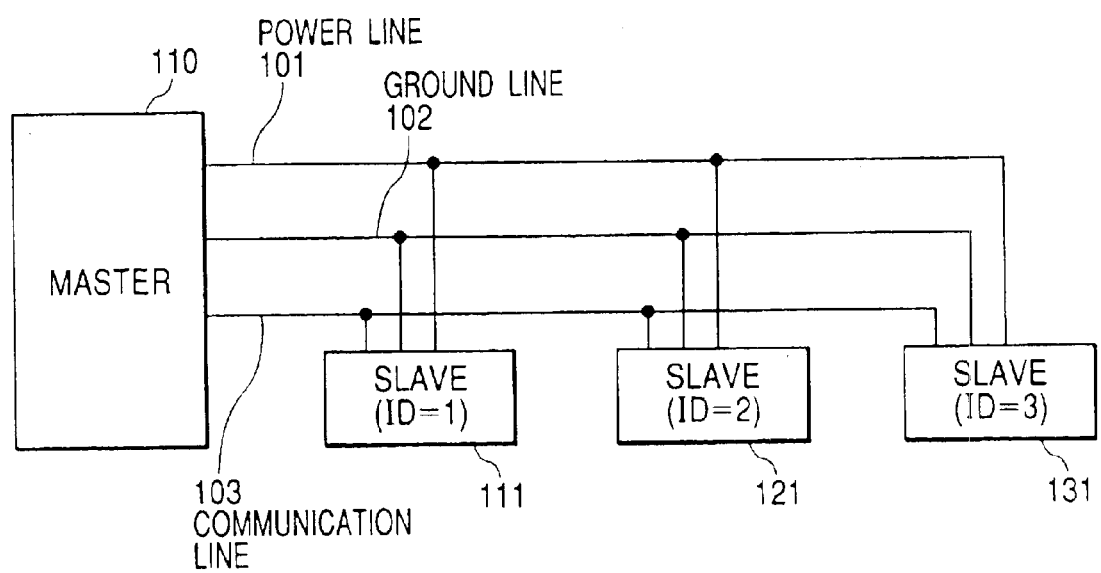
FIG. 18 is a block diagram showing a conventional obstacle detecting apparatus for an automotive vehicle.

As shown in FIG. 18, a conventional obstacle detecting apparatus includes a plurality of ultrasonic sensors (i.e., slaves) 111, 121, and 131 installed at right, center, and left portions of a bumper of an automotive vehicle. A controller (i.e., a master) 110 detects the position of an obstacle based on reflected wave signals obtained by respective sensors 111, 121, and 131. The controller 110 generates an alarm when the detected obstacle is within a predetermined warning distance.

More specifically, the controller 110 memorizes beforehand the identification data (IDs) corresponding to respective sensor installation positions (i.e., right, center, and left portions of a bumper) to which the ultrasonic sensors 111, 121, and 131 are to be installed. On the other hand, respective ultrasonic sensors 111, 121, and 131 are given or assigned individual ID data.

When the ultrasonic sensors 111, 121, and 131 are installed on the bumper, each of ultrasonic sensors 111, 121, and 131 is bus connected to controller 110 via power line 101, ground line 102, and communication line 103. The controller 110 collects distance information from respective ultrasonic sensors 111, 121, and 131 by performing the polling/selecting processing.

However, according to the conventional obstacle detecting apparatus shown in FIG. 18, anticoincidence will occur when a worker mistakenly installs a ultrasonic sensor to a different position of the bumper. In such a case, the ID information memorized in the controller 110 do not agree with the actually installed sensor. Alarming will not be performed properly.

To solve the above-described problem, the third embodiment of the present invention provides a communication apparatus capable of accurately setting ID for each sensor (i.e., slave) without forcing a worker during the installation work to carefully check the agreement between each sensor and a designated installation position.

Figure 6:
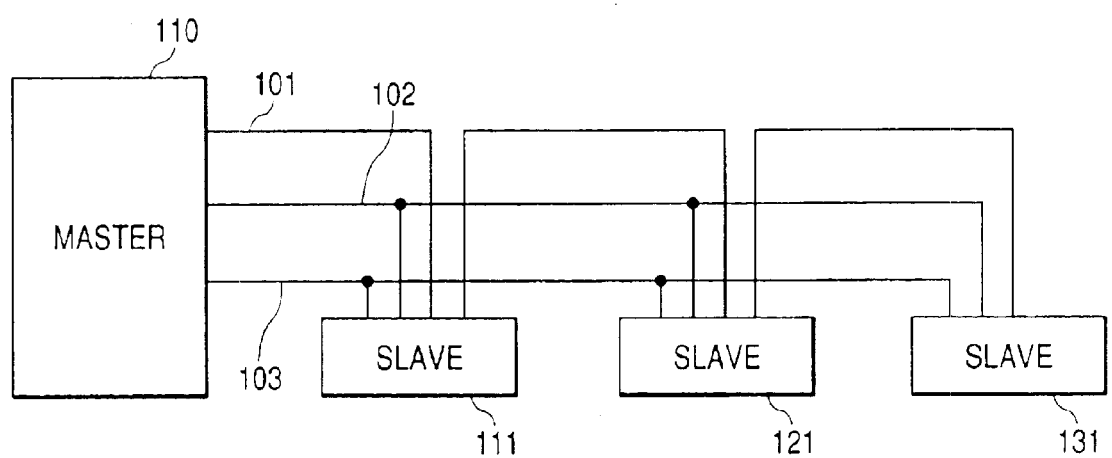
FIG. 6 is a block diagram showing an obstacle detecting apparatus for an automotive vehicle, serving as a communication apparatus, in accordance with a third embodiment of the present invention.
Figure 7:
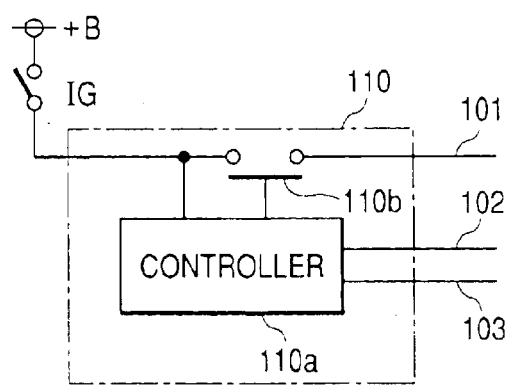
FIG. 7 is a circuit diagram showing the arrangement of a master shown in FIG. 6 in accordance with the third embodiment of the present invention.
Figure 10:
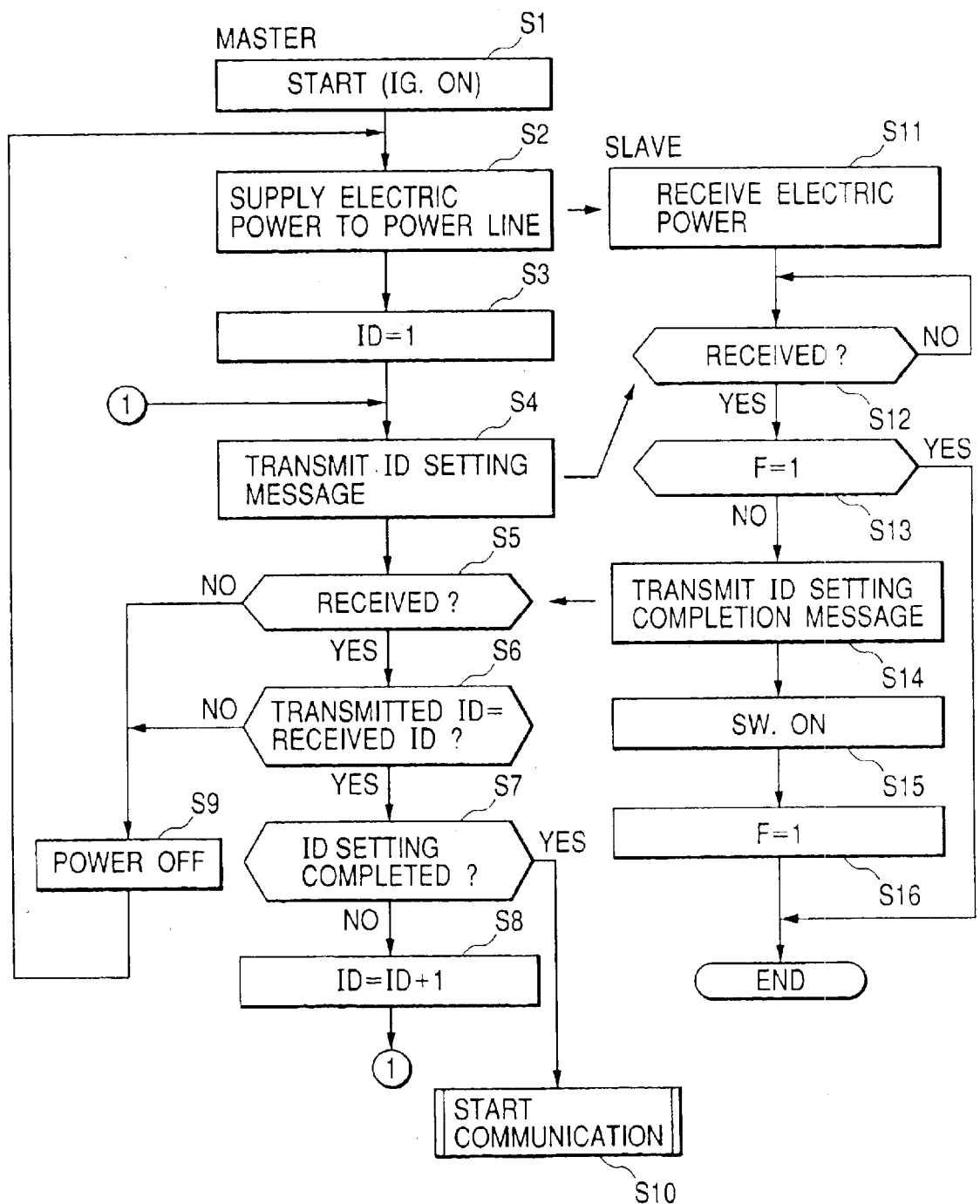
FIG. 10 is a flowchart showing the ID setting operation performed between the master and the slaves in accordance with the third embodiment of the present invention.
Figure 11:
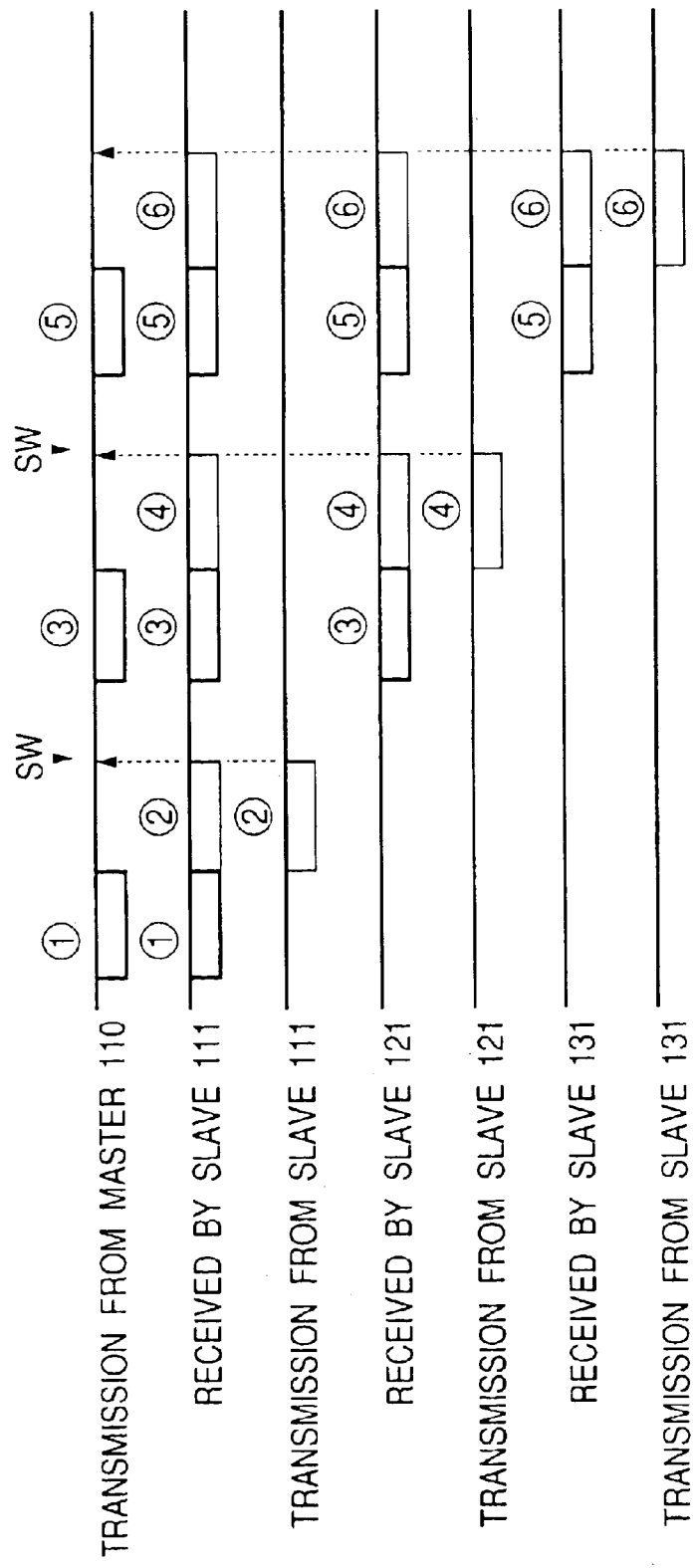
FIG. 11 is a timing chart showing communication sequence of the communication apparatus shown in FIG. 6 in accordance with the third embodiment of the present invention.

The third embodiment of the present invention will be explained with reference to the attached drawings. FIG. 6 shows an obstacle detecting apparatus for an automotive vehicle, serving as a communication apparatus, in accordance with the third embodiment of the present invention. FIG. 7 shows the arrangement of a master shown in FIG. 6. FIG. 8A shows the arrangement of first and second slaves shown in FIG. 6. FIG. 8B shows the arrangement of a third slave shown in FIG. 6. FIG. 9 explains the format of a communication frame used between the master and slaves in accordance with the third embodiment of the present invention. FIG. 10 is a flowchart showing the ID setting operation performed between the master and the slaves in accordance with the third embodiment of the present invention. FIG. 11 is a timing chart showing communication sequence of the communication apparatus shown in FIG. 6.

The master 110 shown in FIG. 6 is a control unit serving as part of the obstacle detecting apparatus. The master 110 comprises a nonvolatile memory (not shown) which stores ID data corresponding to left, center, and right positions of a vehicle bumper. A plurality of, first, second, and third, slaves 111, 121, and 131 are ultrasonic sensors each serving as part of the obstacle detecting apparatus. The first, second, and third slaves 111, 121, and 131 are installed in this order to the left, center, and right positions of the vehicle bumper. The first slave 111 is closest to the master 110. The third slave 131 is farthest from the master 110. Before being installed to the bumper, all of the first, second, and third slaves 111, 121, and 131 are assigned no individual ID data.

As shown in FIG. 7, the master 110 has a controller 110a which receives electric power from an automotive battery +B via an ignition switch IG. Furthermore, the master 110 has a switch 110b having one end connected via the ignition switch G to the battery +B and the other end connected to a power line 101. As shown in FIG. 8A, first and second slaves 111 and 121 have a switch 112, a power source circuit 113, and a controller 114. As shown in FIG. 8B, the third slave is a terminal slave which is different from other slaves in that no switch 112 is provided.

The first, second, and third slaves 111, 121, and 131 are connected in series in this order via switches 112. More specifically, the power line 101 extends from the master 110 is connected to one end (i.e., an upstream end) of switch 112 provided in the first slave 111 which is positioned closest to the master 110. Then, the power line 101 extends from the other end (i.e., a downstream end) of switch 112 of first slave 111 into the second slave 121 which is next closest to the master 110. In the second slave 121, the power line 101 is connected to one end of switch 112 provided in this second slave 121. Furthermore, the power line 101 extends from the other end of switch 112 of second slave 121 into the third slave 131 which is positioned furthest from the master 110.

In each of the first and second slaves 111 and 121, the power source circuit 113 is connected between the power line 101 and the ground line 102 at the upstream end of switch 112. The ground line 102 extends directly from the master 110. In the third slave 131, the power source circuit 113 is connected between the power line 101 and the ground line 102. The power source circuit 113 produces an electric power supplied to the controller 114. The controller 114 is directly connected (i.e., bus connected) to the ground line 102 and the communication line 103. The controller 114 controls the switch 112.

FIG. 9 shows the format of a communication frame used between the master 110 and respective slaves 111, 121, and 131. One frame consists of consecutive fields of start-of-frame (SOF), address, message class, ID, frame length, error check code (ECC), and end-of-frame (EOF).

The master 110 assigns individual ID data to respective slaves 111, 121, and 131 by using a communication frame. In this case, the communication frame is an ID setting message which comprises a broadcast address being set in the address field, "ID setting" being set in the message class field, and ID data identifying individual slave being set in the ID field.

Each of slaves 111, 121, and 131 returns to the master 110 a report notifying completion of ID setting by using a communication frame. In this case, the communication frame is an ID setting completion message which comprises a master address being set in the address field, "ID setting completion" being set in the message class, and individual ID data being set in the ID field.

The ID setting operation in accordance with the third embodiment of the present invention will be explained hereinafter with reference to FIGS. 10 and 11.

First, in step S1, the controller 110a of master 110 (hereinafter, referred to as master controller 110a) starts the operation upon receiving electric power from the automotive battery +B via the ignition switch IG. Then, in step S2, the master controller 110a closes switch 110b to supply electric power to the power line 101. With this switching operation, the controller 114 of first slave 111 (hereinafter, referred to as first slave controller $114_1$) receives electric power and starts its operation in step S11 while no electric power is supplied to the controllers 114 of second and third slaves 121 and 131 (hereinafter, referred to as second slave controller $114_2$ and third slave controller $114_3$).

Next, in step S3, the master controller 110a sets an initial value (i.e., ID=1 for the first slave 111). Then, in step S4, the master controller 110a transmits an ID setting message ① (i.e., the communication fame) including the ID data (i.e., ID=1) being set for first slave 111 to the communication line 103 (refer to the timing chart shown in FIG. 11). Then, in step S5, the master controller 110a waits for an ID setting completion message returned from the first slave 111.

Meanwhile, the power source circuit 113 of first slave 111 is activated upon receiving the electric power supplied from the power line 101 via the closed switch 110b of master 110. The power source circuit 113 of first slave 111 supplies electric power to the first slave controller $114_1$. The first slave controller $114_1$ checks in step S12 whether or not the ID setting message is received from the master 110 via the communication line 103. The first slave controller 114, cyclically repeats this check if the ID setting message is not received (i.e., NO in step S12). When the ID setting message is received (i.e., YES in step S12), the first slave controller $114_1$ proceeds to the next step S13 to further check whether or not an ID setting message ignoring flag F is set. When the flag F is not set (i.e., NO in step S13), the first slave controller $114_1$ proceeds to the next step S14. Otherwise (i.e., YES in step S13), the first slave controller $114_1$ ignores the received message and terminates this processing. According to this embodiment, the ID setting message ignoring flag F is initially set to 0 (F=0) and changed to 1 (F=1) after the ID is set for individual slave. As the flag F is not yet set to 1 at this moment, the first slave controller $114_1$ proceeds to step S14.

In the step S14, the first slave controller $114_1$ memorizes or stores the ID data (i.e., ID=1) contained in the received ID setting message ① and then returns an ID setting completion message ② to the master 110. The ID setting completion message ② includes the ID data (i.e., ID=1) of first slave 111 being set or assigned in this manner to inform the master 110 of completion of ID setting operation for the first slave 111. Then, the first slave controller $114_1$ closes the switch 112 in step S15 and sets the ID setting message ignoring flag F in step S16. Then, the first slave controller $114_1$ terminates this processing.

With the closing of switch 112 of first slave 111, electric power is first supplied to the second slave 121. In this condition, no electric power is not supplied to the third slave 131. As, the first slave controller $114_1$ maintains the ID setting message ignoring flag F being set to 1 (i.e., F=1), the first slave controller $114_1$ ignores the ID setting messages ③ and ⑤ for the second and third slaves 121 and 131 later transmitted from the master 110.

On the other hand, the master controller 110a checks in step S5 whether or not the ID setting completion message is received. When the ID setting completion message is received (i.e., YES in step S5), the master controller 110a proceeds to the next step S6. When no ID setting completion message is received (i.e., NO in step S5), the master controller 110a proceeds to the step S9.

In step S6, the master controller 110a compares the ID data (ID=1) contained in the transmitted ID setting message ① with the ID data contained in the received ID setting completion message ②. When both ID data agree with each other (i.e., YES in step S6), the master controller 110a proceeds to the next step S7. When these ID data disagree (i.e., NO in step S6), the master controller 110a proceeds to the step S9. In the step S9, the master controller 110a judges that the ID setting operation has not been successfully accomplished. Then, the master controller 110a opens the switch 110b to once stop the electric power supply to the slaves. The first slave controller $114_1$ opens the switch 112, correspondingly.

Then, the master controller 110a proceeds to the step S2 to restart the ID setting operation for the first slave 111 from the beginning. In other words, the master controller 110a cancels the ID setting operation as soon as any failure is detected in the process of setting ID to the slaves. This canceling operation (i.e., the processing performed in steps S5, S6 and S9) is effective to prevent the ID setting operation from being erroneously executed due to engine noises.

Otherwise, in the step S7, the master controller 110a judges whether or not the ID setting for all of the first to third slaves 111, 121, and 131 is accomplished. As the ID setting operation is not yet accomplished at this moment (i.e., NO in step S7), the master controller 110a proceeds to the next step S8 to set the next value (i.e., ID=2 for the second slave 121) by incrementing the ID data (i.e., ID=ID+1).

Then, the master controller 110a proceeds to step S4 to transmit an ID setting message ③ (i.e., the communication fame) including the ID data (i.e., ID=2) being set for second slave 121 to the communication line 103. Then, in step S5, the master controller 110a waits for an ID setting completion message returned from the second slave 121.

Meanwhile, the power source circuit 113 of second slave 121 is activated upon receiving the electric power supplied from the power line 101 via the closed switch 110b of master 110 and the closed switch 112 of first slave 111. The power source circuit 113 of second slave 121 supplies electric power to the second slave controller $114_2$. The second slave controller $114_2$ checks in step S12 whether or not the ID setting message is received from the master 110 via the communication line 103. The second slave controller $114_2$ cyclically repeats this check if the ID setting message is not received (i.e., NO in step S12). When the ID setting message is received (i.e., YES in step S12), the second slave controller $114_2$ proceeds to the next step S13 to further check whether or not the ID setting message ignoring flag F is set. As the flag F is not yet set to 1 (i.e., NO in step S13), the second slave controller $114_2$ proceeds to the next step S14.

In step S14, the second slave controller $114_2$ memorizes or stores the ID data (i.e., ID=2) contained in the received ID setting message ③ and then returns an ID setting completion message ④ including the ID data (i.e., ID=2) of second slave 121 to the master 110. Then, the second slave controller $114_2$ closes the switch 112 in step S115 and sets the ID setting message ignoring flag F in step S16. Then, the second slave controller $114_2$ terminates this processing.

With the closing of switch 112 of second slave 121, electric power is first supplied to the third slave 131. As the second slave controller $114_2$ maintains the ID setting message ignoring flag F being set to 1 (i.e., F=1), the second slave controller $114_2$ ignores the ID setting message ⑤ for the third slave 131 later transmitted from the master 110.

On the other hand, the master controller 110a checks in step S5 whether or not the ID setting completion message is received. When the ID setting completion message is received (i.e., YES in step S5), the master controller 110a proceeds to the next step S6. When no ID setting completion message is received (i.e., NO in step S5), the master controller 110a proceeds to the step S9.

In step S6, the master controller 110a compares the ID data (ID=2) contained in the transmitted ID setting message ③ with the ID data contained in the received ID setting completion message ④. When both ID data agree with each other (i.e., YES in step S6), the master controller 110a proceeds to the next step S7. When these ID data disagree (i.e., NO in step S6), the master controller 110a proceeds to the step S9. In the step S9, the master controller 110a judges that the ID setting operation has not been successfully accomplished. Then, the master controller 110a opens the switch 110b to once stop the electric power supply to the slaves. The first and second slave controller $114_1$ and $114_2$ open their switches 112, correspondingly.

Then, the master controller 110a proceeds to the step S2 to restart the ID setting operation for the first slave 111 from the beginning.

Otherwise, in the step S7, the master controller 110a judges whether or not the ID setting for all of the first to third slaves 111, 121, and 131 is accomplished. As the ID setting operation is not yet accomplished at this moment (i.e., NO in step S7), the master controller 110a proceeds to the next step S8 to set the next value (i.e., ID=3 for the third slave 131) by incrementing the ID data (i.e., ID=ID+1).

Then, the master controller 110a proceeds to step S4 to transmit an ID setting message ⑤ (i.e., the communication fame) including the ID data (i.e., ID=3) being set for the third slave 131 to the communication line 103. Then, in step S5, the master controller 110a waits for an ID setting completion message returned from the third slave 131.

Meanwhile, the power source circuit 113 of third slave 131 is activated upon receiving the electric power supplied from the power line 101 via the closed switch 110b of master 110, the closed switch 112 of first slave 111, and the closed switch 112 of second slave 121. The power source circuit 113 of third slave 131 supplies electric power to the third slave controller $114_3$. The third slave controller $114_3$ checks in step S12 whether or not the ID setting message is received from the master 110 via the communication line 103. The third slave controller $114_3$ cyclically repeats this check if the ID setting message is not received (i.e., NO in step S12). When the ID setting message is received (i.e., YES in step S12), the third slave controller $114_3$ proceeds to the next step S13 to further check whether or not the ID setting message ignoring flag F is set. As the flag F is not yet set to 1 (i.e., NO in step S13), the third slave controller $114_3$ proceeds to the next step S14.

In step S14, the third slave controller $114_3$ memorizes or stores the ID data (i.e., ID=3) contained in the received ID setting message ⑤ and then returns an ID setting completion message ⑥ including the ID data (i.e., ID=3) of third slave 131 to the master 110. Then, the third slave controller $114_3$ skips the step S15 because no switch 112 is provided in the third slave 131 (refer to FIG. 8B). Then, the third slave controller $114_3$ sets the ID setting message ignoring flag F in step S16. Then, the third slave controller $114_3$ terminates this processing.

On the other hand, the master controller 110a checks in step S5 whether or not the ID setting completion message is received. When the ID setting completion message is received (i.e., YES in step S5), the master controller 110a proceeds to the next step S6. When no ID setting completion message is received (i.e., NO in step S5), the master controller 110a proceeds to the step S9.

In step S6, the master controller 110a compares the ID data (ID=3) contained in the transmitted ID setting message ⑤ with the ID data contained in the received ID setting completion message ⑥. When both ID data agree with each other (i.e., YES in step S6), the master controller 110a proceeds to the next step S7. When these ID data disagree (i.e., NO in step S6), the master controller 110a proceeds to the step S9. In the step S9, the master controller 110a judges that the ID setting operation has not been successfully accomplished. Then, the master controller 110a opens the switch 110b to once stop the electric power supply to the slaves. The first and second slave controllers $114_2$ and $114_3$ open their switches 112, correspondingly.

Then, the master controller 110a proceeds to the step S2 to restart the ID setting operation for the first slave 111 from the beginning.

Otherwise, in the step S7, the master controller 110a judges whether or not the ID setting for all of the first to third slaves 111, 121, and 131 is accomplished. As the ID setting operation for all of the first to third slaves 111, 121, and 131 is just accomplished (i.e., YES in step S7), the master controller 110a proceeds to step S10.

In the step S10, the master 110 starts the communication for collecting the data or information from respective slaves 111, 121, and 131 according to the polling/selecting method.

As apparent from the foregoing description, according to the third embodiment of the present invention, the power line extending from the master 110 is successively and serially connected to the first, second, and third slaves 111, 121, and 131 via the switches 112 provided in the first and second slaves. The ground line 102 and the communication line 103 are directly connected (i.e., bus connected) to each of the first, second, and third slaves 111 , 121, and 131. The ID setting operation for respective slaves is performed in the order of closeness to the master 110 by selectively closing the switches 112 as described above. Thus, the third embodiment of the present invention provides a communication apparatus capable of accurately setting ID for each of slaves 111, 121, and 131 without forcing a worker during the installation to carefully check the agreement between each slave and a designated installation position.

Figure 12:
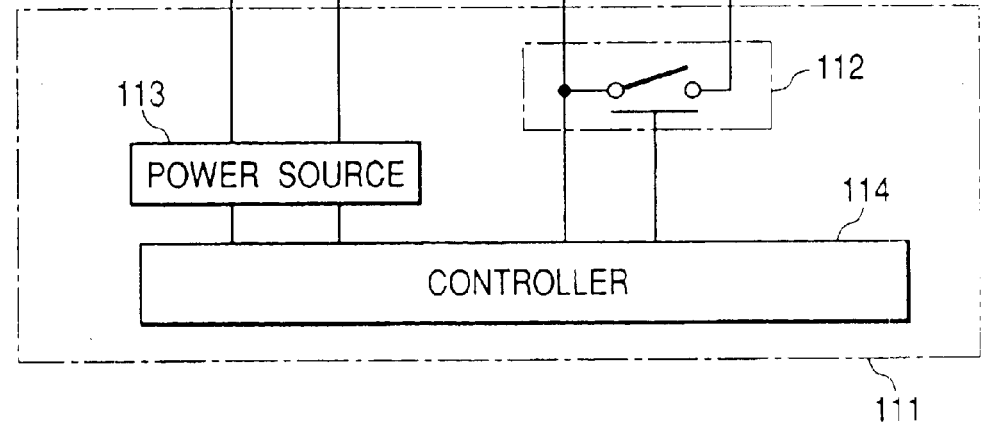
FIG. 12 is a circuit diagram showing the arrangement of a modified communication apparatus in accordance with the third embodiment.

FIG. 12 is a circuit diagram showing the arrangement of a modified communication apparatus in accordance with the third embodiment.

According to the circuit arrangement shown in FIG. 12, the communication line 103 extending from the master 110 is successively and serially connected to the first, second, and third slaves 111, 121, and 131 via the switches 112 provided in the first and second slaves. The power line 101 and the ground line 102 are directly connected (i.e., bus connected) to each of the first, second, and third slaves 111, 121, and 131.

According to this circuit arrangement, all of the first, second, and third slaves 111, 121, and 131 are simultaneously activated upon receiving the electric power from the automotive battery +B via the ignition switch IG. However, the communication line 103 is successively connected to the first slave 111, 121, and 131 in this order by selectively closing the switches 112 so as to execute the communication sequence shown in FIG. 11.

In the flowchart shown in FIG. 10, the explanation of step S15 should be replaced so as to read that, upon closing of switch 112 of each slave, ID setting message is first supplied to the succeeding slave.

Thus, The ID setting operation for respective slaves 111, 121, and 131 is performed in the order of closeness to the master 110 by selectively closing the switches 112 as described above. Thus, it becomes possible to provide a communication apparatus capable of accurately setting ID for each of slaves 111, 121, and 131 without forcing a worker during the installation to carefully check the agreement between each slave and a designated installation position.

Figure 13:
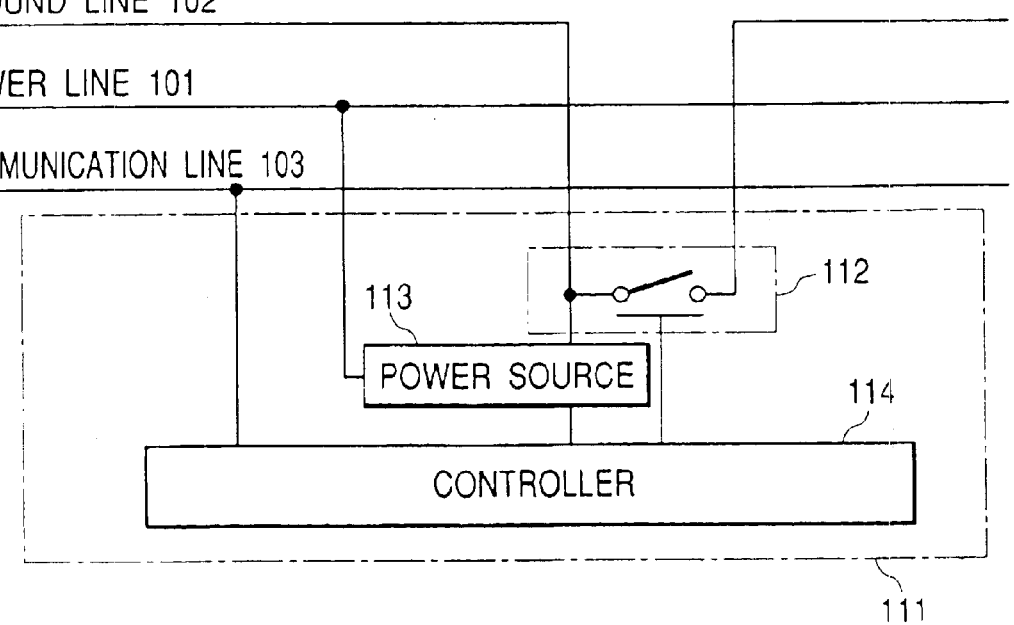
FIG. 13 is a circuit diagram showing the arrangement of another modified communication apparatus in accordance with the third embodiment.

FIG. 13 is a circuit diagram showing the arrangement of another modified communication apparatus in accordance with the third embodiment.

According to the circuit arrangement shown in FIG. 13, the ground line 102 extending from the master 110 is successively and serially connected to the first, second, and third slaves 111, 121, and 131 via the switches 112 provided in the first and second slaves. The power line 101 and the communication line 103 are directly connected (i.e., bus connected) to each of the first, second, and third slaves 111, 121, and 131.

The flowchart of FIG. 10 is substantially applicable to this modified arrangement, although the power source circuit 113 is activated upon receiving the electric power flowing into the ground line 102 via the closed switch 112.

According to this circuit arrangement, the ID setting operation for respective slaves 111, 121, and 131 is performed in the order of closeness to the master 110 by selectively closing the switches 112 as described above. Thus, it becomes possible to provide a communication apparatus capable of accurately setting ID for each of slaves 111, 121, and 131 without forcing a worker during the installation work to carefully check the agreement between each slave and a designated installation position.

Fourth Embodiment

Figure 14:
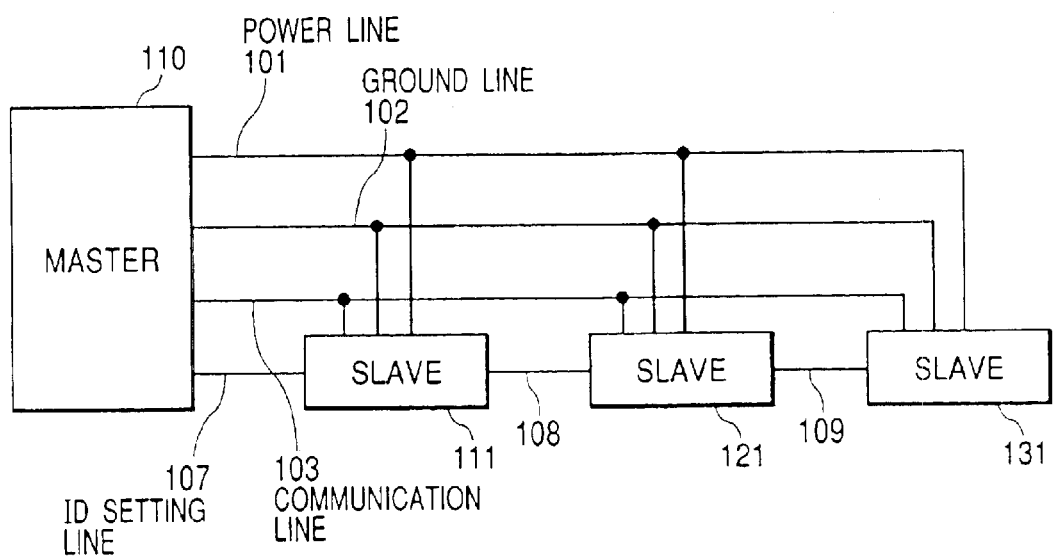
FIG. 14 is a block diagram showing an obstacle detecting apparatus for an automotive vehicle, serving as a communication apparatus, in accordance with a fourth embodiment of the present invention.

FIG. 14 is a block diagram showing an obstacle detecting apparatus for an automotive vehicle, serving as a communication apparatus, in accordance with a fourth embodiment of the present invention.

The communication apparatus is different from the conventional apparatus shown in FIG. 18 in including a first ID setting line 107 connecting the master 110 to the first slave 111, a second ID setting line 108 connecting the first slave 111 to the second slave 121, and a third ID setting line 109 connecting the second slave 121 to the third slave 131. In other words, the first to third ID setting lines 107 to 109 serially connect the master 110 and the first to third slaves 111, 121, and 131. The power line 101, ground line 102, and communication line 103, respectively extending from the master 110, are directly connected (i.e., bus connected) to each of the first, second, and third slaves 111, 121, and 131.

Figure 15:
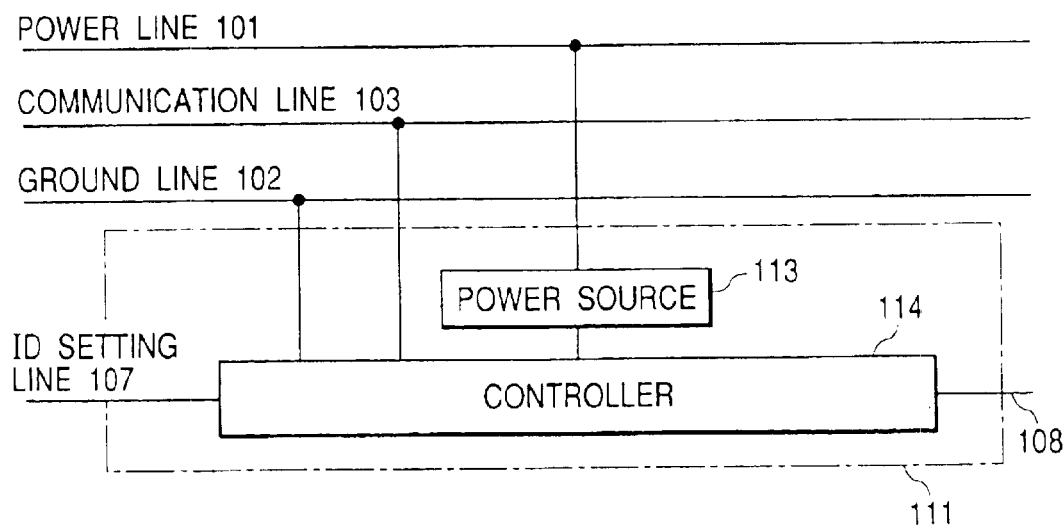
FIG. 15 is a circuit diagram showing the arrangement of a slave shown in FIG. 14 in accordance with the fourth embodiment of the present invention.

FIG. 15 shows the arrangement of first slave 111 which comprises a power source circuit 113 connected to the power line 101 and a controller 114 receiving electric power via the power source circuit 113 and is directly connected to the ground line 102 and the communication line 103. The controller 114 interposes between the first ID setting line 107 and the second ID setting line 108. Although not shown, other slaves 121 and 131 have the same or similar arrangement.

Each slave inputs the ID setting message from the communication line 103 only when the ID setting line is high-active and the above-described ID setting message ignoring flag F is not set (i.e., F=0).

Figure 16:
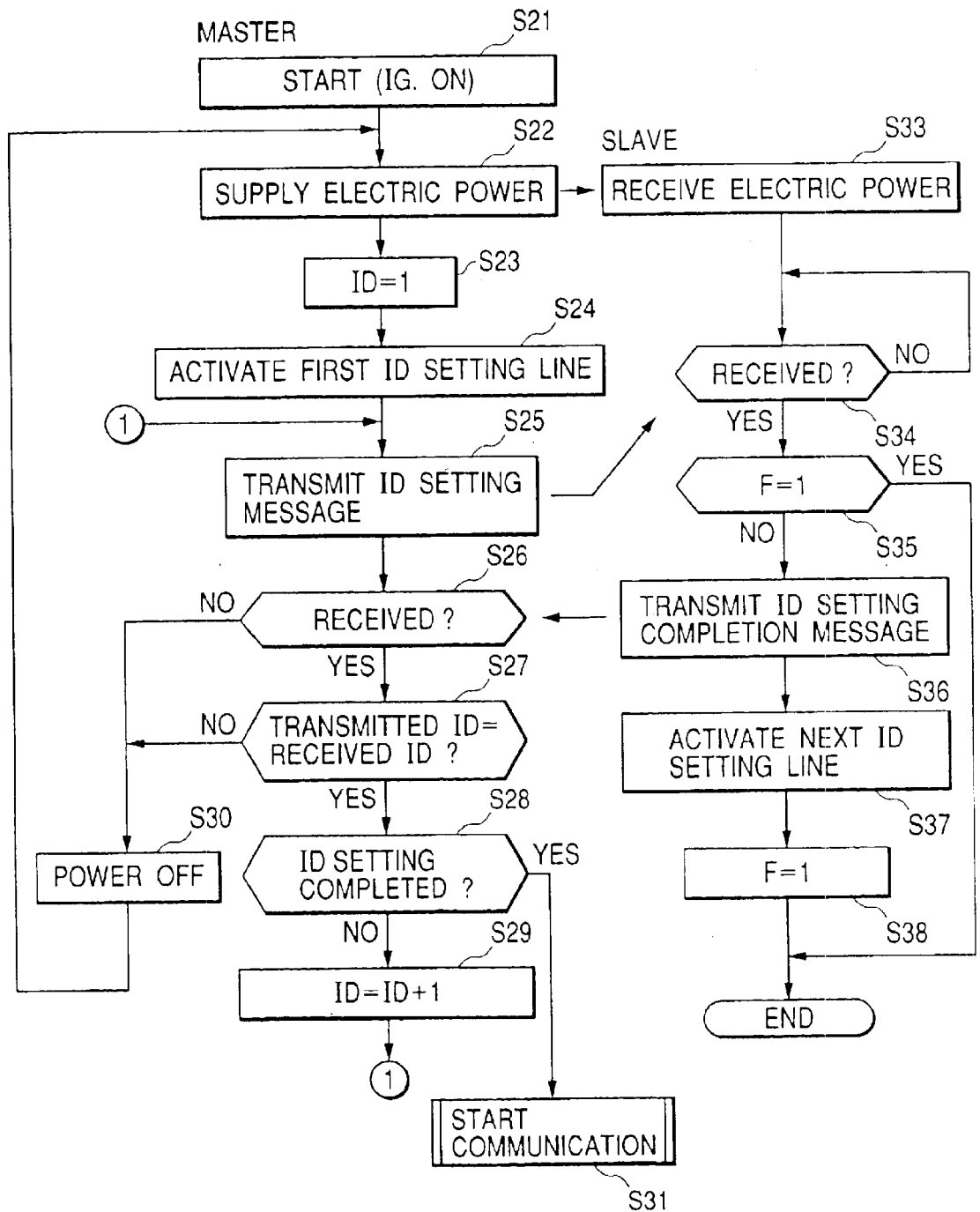
FIG. 16 is a flowchart showing the ID setting operation performed between the master and the slaves in accordance with the fourth embodiment of the present invention.
Figure 17:
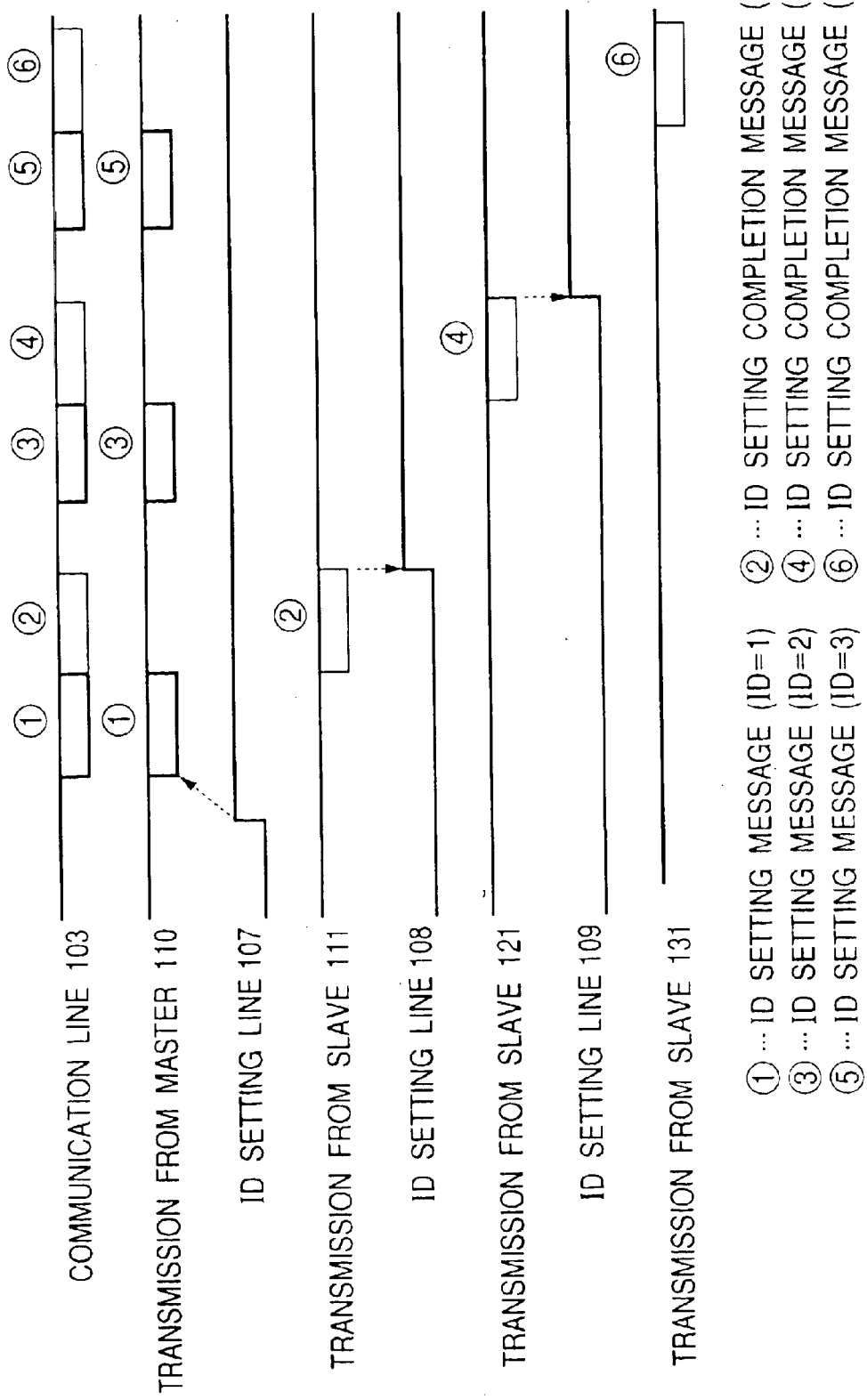
FIG. 17 is a timing chart showing communication sequence of the communication apparatus shown in FIG. 14 in accordance with the fourth embodiment of the present invention.

More specifically, the ID setting operation in accordance with the fourth embodiment of the present invention will be explained hereinafter with reference to the flowchart of FIG. 16 and the communication sequence of FIG. 17.

First, in step S21, the main controller 110a starts the operation upon receiving electric power from the automotive battery +B via the ignition switch IG. Then, in step S22, the master controller 110a closes switch 110b to supply electric power to the power line 101. With this switching operation, each of the first to third slave controllers $114_1$, $114_2$, and $114_3$ receives electric power and starts its operation in step S33.

Next, in step S23, the master controller 110a sets an initial value (i.e., ID=1 for the first slave 111). Then, in the next step S24, the master controller 110a changes the condition of first ID setting line 107 into H (high-active) from L. Then, in step S25, the master controller 110a transmits an ID setting message ① (i.e., the communication fame) including the ID data (i.e., ID=1) being set for first slave 111 to the communication line 103 (refer to the timing chart shown in FIG. 17). Then, in step S26, the master controller 110a waits for an ID setting completion message returned from the first slave 111.

Meanwhile, in each of first to third slaves 111, 121, and 131, the power source circuit 113 is activated upon receiving the electric power supplied from the power line 101 via the closed switch 110b of master 110. The power source circuit 113 supplies electric power to the slave controller 114.

According to the fourth embodiment of the present invention, each slave inputs the ID setting message from the communication line 103 only when the ID setting line is high-active and the above-described ID setting message ignoring flag F is not set (i.e., F=0).

As the ID setting line 7 is high-active, the first slave controller $114_1$ checks in step S34 whether or not the ID setting message is received from the master 110 via the communication line 103. The first slave controller $114_1$ cyclically repeats this check if the ID setting message is not received (i.e., NO in step S34). When the ID setting message is received (i.e., YES in step S34), the first slave controller 114, proceeds to the next step S35 to further check whether or not an ID setting message ignoring flag F is set. When the flag F is not set (i.e., NO in step S35), the first slave controller $114_1$ proceeds to the next step S36. Otherwise (i.e., YES in step S35), the first slave controller $114_1$ ignores the received message and terminates this processing. According to this embodiment, the ID setting message ignoring flag F is initially set to 0 (F=0) and changed to 1 (F=1) after the ID is set for individual slave. As the flag F is not yet set to 1 at this moment, the first slave controller $114_1$ proceeds to step S36.

In the step S36, the first slave controller $114_1$ memorizes or stores the ID data (i.e., ID=1) contained in the received ID setting message ① and then returns an ID setting completion message ② to the master 110. The ID setting completion message ② includes the ID data (i.e., ID=1) of first slave 111 being set or assigned in this manner to inform the master 110 of completion of ID setting operation for the first slave 111. Then, in step S37, the first slave controller $114_1$ changes the condition of second ID setting line 108 into H (high-active) from L and terminates this processing. Then, in step S38, the first slave controller $114_1$ sets the ID setting message ignoring flag F.

As, the first slave controller 114, maintains the ID setting message ignoring flag F being set to 1 (i.e., F=1), the first slave controller $114_1$ ignores the ID setting messages ③ and ⑤ for the second and third slaves 121 and 131 later transmitted from the master 110.

On the other hand, the master controller 110a checks in step S26 whether or not the ID setting completion message is received. When the ID setting completion message is received (i.e., YES in step S26), the master controller 110a proceeds to the next step S27. When no ID setting completion message is received (i.e., NO in step S26), the master controller 110a proceeds to the step S30.

In step S27, the master controller 110a compares the ID data (ID=1) contained in the transmitted ID setting message ① with the ID data contained in the received ID setting completion message ②. When both ID data agree with each other (i.e., YES in step S27), the master controller 110a proceeds to the next step S28. When these ID data disagree (i.e., NO in step S27), the master controller 110a proceeds to the step S30. In the step S30, the master controller 110a judges that the ID setting operation has not been successfully accomplished. Then, the master controller 110a opens the switch 110b to once stop the electric power supply to the slaves.

Then, the master controller 110a proceeds to the step S22 to restart the ID setting operation for the first slave 111 from the beginning. In other words, the master controller 110a cancels the ID setting operation as soon as any failure is detected in the process of setting ID to the slaves, thereby eliminating erroneous ID setting operation.

Otherwise, in the step S28, the master controller 110a judges whether or not the ID setting for all of the first to third slaves 111, 121, and 131 is accomplished. As the ID setting operation is not yet accomplished at this moment (i.e., NO in step S28), the master controller 110a proceeds to the next step S29 to set the next value (i.e., ID=2 for the second slave 121) by incrementing the ID data (i.e., ID=ID+1).

Returning to step S25, the master controller 110a transmits an ID setting message ③ (i.e., the communication fame) including the ID data (i.e., ID=2) being set for second slave 121 to the communication line 103. Then, in step S26, the master controller 110a waits for an ID setting completion message returned from the second slave 121.

Meanwhile, the second slave controller $114_2$ checks in step S34 whether or not the ID setting message is received from the master 110 via the communication line 103. The second slave controller $114_2$ cyclically repeats this check if the ID setting message is not received (i.e., NO in step S34). When the ID setting message is received (i.e., YES in step S34), the second slave controller $114_2$ proceeds to the next step S35 to further check whether or not the ID setting message ignoring flag F is set. As the flag F is not yet set to 1 at this moment (i.e., NO in step S35), the second slave controller $114_2$ proceeds to the next step S36.

In step S36, the second slave controller $114_2$ memorizes or stores the ID data (i.e., ID=2) contained in the received ID setting message ③ and then returns an ID setting completion message ④ including the ID data (i.e., ID=2) of second slave 121 to the master 110. Then, in step S37, the second slave controller $114_2$ changes the condition of third ID setting line 109 into H (high-active) from L and terminates this processing. Then, in step S38, the second slave controller $114_2$ sets the ID setting message ignoring flag F.

As the second slave controller $114_2$ maintains the ID setting message ignoring flag F being set to 1 (i.e., F=1), the second slave controller $114_2$ ignores the ID setting message ⑤ for the third slave 131 later transmitted from the master 110.

On the other hand, the master controller 110a checks in step S26 whether or not the ID setting completion message is received. When the ID setting completion message is received (i.e., YES in step S26), the master controller 110a proceeds to the next step S27. When no ID setting completion message is received (i.e., NO in step S26), the master controller 110a proceeds to the step S30.

In step S27, the master controller 110a compares the ID data (ID=2) contained in the transmitted ID setting message ③ with the ID data contained in the received ID setting completion message ④. When both ID data agree with each other (i.e., YES in step S27), the master controller 110a proceeds to the next step S28. When these ID data disagree (i.e., NO in step S27), the master controller 110a proceeds to the step S30. In the step S30, the master controller 110a judges that the ID setting operation has not been successfully accomplished. Then, the master controller 110a opens the switch 110b to once stop the electric power supply to the slaves.

Then, the master controller 110a proceeds to the step S22 to restart the ID setting operation for the first slave 111 from the beginning.

Otherwise, in the step S28, the master controller 110a judges whether or not the ID setting for all of the first to third slaves 111, 121, and 131 is accomplished. As the ID setting operation is not yet accomplished at this moment (i.e., NO in step S28), the master controller 110a proceeds to the next step S29 to set the next value (i.e., ID=3 for the third slave 131) by incrementing the ID data (i.e., ID=ID+1).

Returning to step S25, the master controller 110a transmits an ID setting message ⑤ (i.e., the communication fame) including the ID data (i.e., ID=3) being set for the third slave 131 to the communication line 103. Then, in step S26, the master controller 110a waits for an ID setting completion message returned from the third slave 131.

Meanwhile, the third slave controller $114_3$ checks in step S34 whether or not the ID setting message is received from the master 110 via the communication line 103. The third slave controller $114_3$ cyclically repeats this check if the ID setting message is not received (i.e., NO in step S34). When the ID setting message is received (i.e., YES in step S34), the third slave controller $114_3$ proceeds to the next step S35 to further check whether or not the ID setting message ignoring flag F is set. As the flag F is not yet set to 1 (i.e., NO in step S35), the third slave controller $114_3$ proceeds to the next step S36.

In step S36, the third slave controller $114_3$ memorizes or stores the ID data (i.e., ID=3) contained in the received ID setting message ⑤ and then returns an ID setting completion message ⑥ including the ID data (i.e., ID=3) of third slave 131 to the master 110. Then, the third slave controller $114_3$ sets the ID setting message ignoring flag F in step S37 and terminates this processing.

On the other hand, the master controller 110a checks in step S26 whether or not the ID setting completion message is received. When the ID setting completion message is received (i.e., YES in step S26), the master controller 110a proceeds to the next step S27. When no ID setting completion message is received (i.e., NO in step S26), the master controller 110a proceeds to the step S30.

In step S27, the master controller 110a compares the ID data (ID=3) contained in the transmitted ID setting message ⑤ with the ID data contained in the received ID setting completion message ⑥. When both ID data agree with each other (i.e., YES in step S27), the master controller 110a proceeds to the next step S28. When these ID data disagree (i.e., NO in step S27), the master controller 110a proceeds to the step S30. In the step S30, the master controller 110a judges that the ID setting operation has not been successfully accomplished. Then, the master controller 110a opens the switch 110b to once stop the electric power supply to the slaves.

Then, the master controller 110a proceeds to the step S22 to restart the ID setting operation for the first slave 111 from the beginning.

Otherwise, in the step S28, the master controller 110a judges whether or not the ID setting for all of the first to third slaves 111, 121, and 131 is accomplished. As the ID setting operation for all of the first to third slaves 111, 121, and 131 is just accomplished (i.e., YES in step S28), the master controller 110a proceeds to step S31.

In the step S31, the master 110 starts the communication for collecting the data or information from respective slaves 111, 121, and 131 according to the polling/selecting method.

As apparent from the foregoing description, according to the above-described fourth embodiment of the present invention, the ID setting operation for respective slaves 111, 121, and 131 is performed in the order of closeness to the master 110 by successively activating the ID setting lines 107, 108, and 109. Thus, it becomes possible to provide a communication apparatus capable of accurately setting ID for each of slaves 111, 121, and 131 without forcing a worker during the installation work to carefully check the agreement between each slave and a designated installation position.

What is claimed is:

1. An obstacle detecting apparatus comprising:
   at least one sensor installed at a predetermined position of an automotive vehicle, said sensor having a capability of performing calculation for measuring a distance between an obstacle and said automotive vehicle and transmitting distance information representing a measured distance of said obstacle; and
   a control unit for receiving said distance information and generating an alarm signal based on the distance information;
   wherein said sensor comprises:
   a comparator for generating an obstacle detection signal when the signal level of a distance measuring signal reflected from said obstacle is higher than a predetermined threshold, and
   a nonvolatile memory storing said threshold,
   wherein said control unit transmits to said nonvolatile memory an initial value of said threshold which is adjusted beforehand so as to eliminate manufacturing differences or variability of individual sensors.

2. The obstacle detecting apparatus in accordance with claim 1, wherein
   said control unit successively transmits polling signals for a plurality of sensors,
   said plurality of sensors simultaneously start measurement of said obstacle in response to a designated one of said polling signals, and
   each of said plurality of sensors calculates the distance between said obstacle and said automotive vehicle and transmits said distance information to said control unit in synchronism with a polling signal corresponding to said each of said plurality of sensors.

3. The obstacle detecting apparatus in accordance with claim 1, wherein
   said control unit is connected to a plurality of sensors via a bus, and identification setting lines are provided independent of said bus for successively and serially connecting said plurality of sensors,
   wherein said control unit activates a first identification setting line connecting said control unit to a first sensor which is closest to said control unit,
   said control unit assigns identification data to said first sensor according to an installation position of said first sensor via said bus in response to activation of said first identification setting line,
   said first sensor activates a second identification setting line connecting said first sensor to a second sensor which is next closest to said control unit, and
   said control unit assigns identification data to said second sensor according to an installation position of said second sensor via said bus in response to activation of said second identification setting line, thereby successively assigning individual identification data to respective sensors in order of closeness to said control unit.

4. An obstacle detecting apparatus comprising:
   at least one sensor installed at a predetermined position of an automotive vehicle, said sensor having a capability of performing calculation for measuring a distance between an obstacle and said automotive vehicle and transmitting distance information representing a measured distance of said obstacle; and
   a control unit for receiving said distance information and generating an alarm signal based on the distance information;
   wherein
   said sensor comprises a nonvolatile memory for storing an oscillation frequency of a distance measuring signal transmitted to said obstacle, and
   said nonvolatile memory receives from an external device said oscillation frequency which is adjusted beforehand so as to eliminate manufacturing differences or variability of individual sensors.

5. An obstacle detecting apparatus comprising:
at least one sensor installed at a predetermined position of an automotive vehicle, said sensor having a capability of performing calculation for measuring a distance between an obstacle and said automotive vehicle and transmitting distance information representing a measured distance of said obstacle; and
a control unit for receiving said distance information and generating an alarm signal based on the distance information;
wherein
said sensor comprises a nonvolatile memory for storing an amplifying gain of a distance measuring signal reflected from said obstacle, and
said nonvolatile memory receives from an external device said amplifying gain which is adjusted beforehand so as to eliminate manufacturing differences or variability of individual sensors.

6. An obstacle detecting apparatus comprising:
at least one sensor installed at a predetermined position of an automotive vehicle, said sensor having a capability of performing calculation for measuring a distance between an obstacle and said automotive vehicle and transmitting distance information representing a measured distance of said obstacle; and
a control unit for receiving said distance information and generating an alarm signal based on the distance information;
wherein
said control unit is connected to a plurality of sensors via a bus, and
switches are provided for successively and serially connecting said plurality of sensors via said bus,
wherein said control unit establishes a first bus route for connecting said control unit to a first sensor which is closest to said control unit,
said control unit assigns identification data to said first sensor according to an installation position of said first sensor via said first bus route,
said first sensor closes a switch to establish a second bus route for connecting said first switch to a second switch which is next closest to said control unit, and
said control unit assigns identification data to said second sensor according to an installation position of said second sensor via said first and second bus routes, thereby successively assigning individual identification data to respective sensors in order of closeness to said control unit.

7. The obstacle detecting apparatus in accordance with claim 6, wherein a power line extending from said control unit serially connects said plurality of sensors via said switches, and said first sensor closes the switch to establish a power line for supplying electric power from said control unit to said second sensors.

8. The obstacle detecting apparatus in accordance with claim 6, wherein a communication line extending from said control unit serially connects said plurality of sensors via said switches, and said first sensor closes the switch to establish a communication line for transmitting a message from said control unit to said second sensor.

9. The obstacle detecting apparatus in accordance with claim 6, wherein a ground line extending from said control unit serially connects said plurality of sensors via said switches, and said first sensor closes the switch to establish a ground line for supplying electric power from said control unit to said second sensor.

10. A communication apparatus comprising:
a master apparatus;
a plurality of slave apparatuses disposed at predetermined positions and connected via a bus to said master apparatus; and
switches for successively and serially connecting said plurality of slave apparatuses via said bus,
wherein said master apparatus establishes a first bus route for connecting said master apparatus to a first slave apparatus which is closest to said master apparatus,
said master apparatus assigns identification data to said first slave apparatus according to an installation position of said first slave apparatus via said first bus route,
said first slave apparatus closes a switch to establish a second bus route for connecting said first slave apparatus to a second slave apparatus which is next closest to said master, and
said master apparatus assigns identification data to said second slave apparatus according to an installation position of said second slave apparatus via said first and second bus routes, thereby successively assigning individual identification data to respective slave apparatuses in order of closeness to said master.

11. The communication apparatus in accordance with claim 10, wherein a power line extending from said master apparatus serially connects said plurality of slave apparatuses via said switches, and said first slave apparatus closes the switch to establish a power line for supplying electric power from said master apparatus to said second slave apparatus.

12. The communication apparatus in accordance with claim 10, wherein a communication line extending from said master apparatus serially connects said plurality of slave apparatuses via said switches, and said first slave apparatus closes the switch to establish a communication line for transmitting a message from said master apparatus to said second slave apparatus.

13. The communication apparatus in accordance with claim 10, wherein a ground line extending from said master apparatus serially connects said plurality of slave apparatuses via said switches, and said first slave apparatus closes the switch to establish a ground line for supplying electric power from said master apparatus to said second slave apparatus.

14. A communication apparatus comprising:
a master apparatus;
a plurality of slave apparatuses disposed at predetermined positions and connected via a bus to said master apparatus; and
identification setting lines provided independent of said bus for successively and serially connecting said plurality of slave apparatuses,
wherein said master apparatus activates a first identification setting line connecting said master apparatus to a first slave apparatus which is closest to said master apparatus,
said master apparatus assigns identification data to said first slave apparatus according to an installation position of said first slave apparatus via said bus in response to activation of said first identification setting line,
said first slave apparatus activates a second identification setting line connecting said first slave apparatus to a second slave apparatus which is next closest to said master apparatus, and
said master apparatus assigns identification data to said second slave apparatus according to an installation position of said second slave apparatus via said bus in response to activation of said second identification setting line, thereby successively assigning individual identification data to respective slave apparatuses in order of closeness to said master apparatus.

15. The communication apparatus in accordance with claim 10 or claim 14, wherein said plurality of slaves are obstacle detecting sensors installed at predetermined positions of an automotive vehicle, and said master apparatus is a control unit for assigning individual identification data to respective sensors according to the installation positions of respective sensors and for detecting the position of a detected obstacle with reference to identification data of the sensor.

* * * * *